United States Patent
Minato et al.

(10) Patent No.: US 10,327,167 B2
(45) Date of Patent: Jun. 18, 2019

(54) DEVICE SELECTION METHOD AND DEVICE SELECTION APPARATUS

(71) Applicant: FUJITSU LIMITED, Kawasaki-shi, Kanagawa (JP)

(72) Inventors: Masako Minato, Fuchu (JP); Masahiko Murakami, Kawasaki (JP); Kenichi Horio, Yokohama (JP); Shunsuke Yamaguchi, Kawasaki (JP); Daijiro Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 15/650,578

(22) Filed: Jul. 14, 2017

(65) Prior Publication Data

US 2018/0054748 A1 Feb. 22, 2018

(30) Foreign Application Priority Data

Aug. 16, 2016 (JP) .................. 2016-159731

(51) Int. Cl.
*H04W 52/02* (2009.01)
*H04W 24/08* (2009.01)
(Continued)

(52) U.S. Cl.
CPC ....... *H04W 24/08* (2013.01); *H04W 52/0274* (2013.01); *H04W 24/10* (2013.01);
(Continued)

(58) Field of Classification Search
CPC . H04W 24/08; H04W 24/10; H04W 52/0274; H04W 52/0261; H04W 88/182; Y02D 70/26; Y02D 70/00; Y02D 70/164
See application file for complete search history.

(56) References Cited

U.S. PATENT DOCUMENTS 8,478,360 B2 * 7/2013 Soliman ............ H04W 52/0274 455/574
2009/0221303 A1 * 9/2009 Soliman ............ H04W 52/0274 455/458

(Continued)

FOREIGN PATENT DOCUMENTS

| JP | 2003-274049 A | 9/2003 |
| JP | 2011-517389 A | 6/2011 |
| JP | 2015-156662 A | 8/2015 |

*Primary Examiner* — Shen Shiau
(74) *Attorney, Agent, or Firm* — Arent Fox LLP

(57) ABSTRACT

A device selection method includes receiving a start demand of a service from a first device, acquiring positional-information of the first device, estimating a service continuation-time of the service, based on a history of the service continuation-time corresponding to an area to which the positional-information belongs by referring to the history of the service continuation-time for which the service is continuously provided for each area, estimating a battery continuation-time of the first device, based on a remaining battery quantity of the first device and a battery consumption rate of the first device at a time of receiving the start demand, selecting the first device or a second device installed in the area to which the positional-information belongs, based on the service continuation-time and the battery continuation-time, and causing a device selected between the first device and the second device to execute sensing of media data used for the service.

9 Claims, 13 Drawing Sheets

(51) Int. Cl.
*H04W 24/10* (2009.01)
*H04W 88/18* (2009.01)

(52) U.S. Cl.
CPC .... *H04W 52/0235* (2013.01); *H04W 52/0261* (2013.01); *H04W 88/182* (2013.01); *Y02D 70/00* (2018.01); *Y02D 70/164* (2018.01); *Y02D 70/26* (2018.01)

(56) References Cited

U.S. PATENT DOCUMENTS

| | | | |
|---|---|---|---|
| 2012/0054304 A1 | 3/2012 | Pica et al. | |
| 2016/0253187 A1* | 9/2016 | Kim | G06F 9/44505 719/320 |
| 2017/0013562 A1* | 1/2017 | Lim | H04M 1/725 |

* cited by examiner

FIG.3

| SERVICE ID | SERVICE AREA | START TIME | CONTINUA-TION TIME |
|---|---|---|---|
| 0001 | E2 | 12/11 9:00 | 2:30 |
| 0002 | E1 | 12/12 10:00 | 1:30 |
| 0001 | E2 | 12/13 9:30 | 2:00 |

FIG.4

| DEVICE ID | REMAINING QUANTITY | TIME | TIMING |
|---|---|---|---|
| ... | | | |

FIG.5

| DEVICE ID | TYPE | SERVICE AREA | CHARAC- TERISTIC |
|---|---|---|---|
| user30 | PERSON | - | HIGH QUALITY |
| agent50A | PLACE | E1 | HIGH QUALITY |
| agent50B | PLACE | E2 | LOW QUALITY |

FIG.6

| SERVICE ID | DEVICE ID | START TIME | CONSUMP- TION RATE |
|---|---|---|---|
| 0001 | agent50B | 12/13 9:30 | - |
| 0002 | agent50A | 12/12 10:00 | - |
| 0001 | user30 | 12/11 9:00 | 20%/h |

| SERVICE ID | SERVICE START TIME | CONTINUA- |
|---|---|---|
| | SERVICE CONTINUATION TIME = END TIME − START TIME = 12:00−10:00 = 2:00 | |
| 0002 | E1 12/13 9:30 | 1:30 |
| 0001 | E2 12/13 9:30 | 2:00 |
| 0001 | E2 12/14 10:00 | 2:00 |

| DEVICE ID | REMAINING QUANTITY | TIME |
|---|---|---|
| user30 | 80% | 12/14 10:00 |
| ... | | |

| DEVICE ID | TYPE | SERVICE AREA | CHARAC- TERISTIC |
|---|---|---|---|
| user30 | PERSON | - | HIGH QUALITY |
| agent50A | PLACE | E1 | HIGH QUALITY |
| agent50B | PLACE | E2 | LOW QUALITY |

| SERVICE ID | DEVICE ID | START TIME | CONSUMP- TION RATE |
|---|---|---|---|
| 0001 | agent50B | 12/13 9:30 | - |
| 0002 | agent50A | 12/12 10:00 | - |
| 0001 | user30 | 12/11 9:00 | 20%/h |
| 0001 | user30 | 12/14 10:00 | |

| SERVICE ID | SERVICE AREA | START TIME | CONTINUA-TION TIME |
|---|---|---|---|
| 0001 | E2 | 12/11 9:00 | 2:30 |
| 0002 | E1 | 12/12 10:00 | 1:30 |
| 0001 | E2 | 12/13 9:30 | 2:00 |
| 0001 | E2 | 12/14 10:00 | 2:00 |

| DEVICE ID | REMAINING QUANTITY | TIME | TIMING |
|---|---|---|---|
| user30 | 80% | 12/14 10:00 | START |
| user30 | 35% | 12/14 12:00 | END |

| DEVICE ID | TYPE | SERVICE AREA | CHARAC-TERISTIC |
|---|---|---|---|
| user30 | PERSON | - | HIGH QUALITY |
| agent50A | PLACE | E1 | HIGH QUALITY |
| 0001 | agent50B | 12/13 9:30 | - |
| 0002 | agent50A | 12/12 9:00 | - |
| 0001 | user30 | 12/11 9:00 | 20%/h |
| 0001 | user30 | 12/14 10:00 | 22.5%/h |

BATTERY CONSUMPTION RATE
=BATTERY REDUCTION AMOUNT / SERVICE CONTINUATION TIME
=45%/2:00=22.5%/h

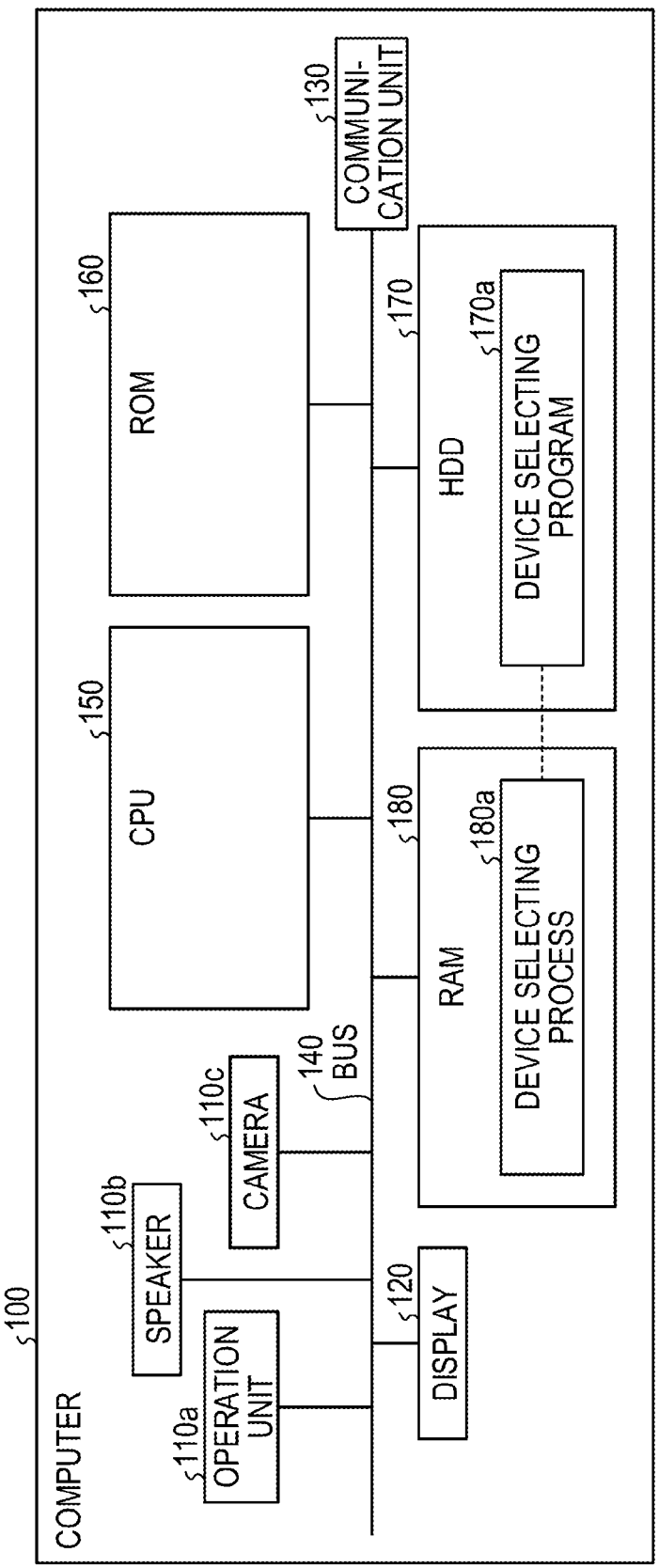

DEVICE SELECTION METHOD AND DEVICE SELECTION APPARATUS

CROSS-REFERENCE TO RELATED APPLICATION

This application is based upon and claims the benefit of priority of the prior Japanese Patent Application No. 2016-159731, filed on Aug. 16, 2016, the entire contents of which are incorporated herein by reference.

FIELD

The embodiments discussed herein are related to a device selection method and a device selection apparatus.

BACKGROUND

With diversification of devices including a smart phone, a tablet terminal, a wearable computer, and the like, various services on the Internet of Things (IoT) are becoming realized. In the Internet of things (IoT) service, as an example, media data sensed by a camera or a microphone mounted on the device are used. For example, there is an IoT service that records conversation or activities of an operator positioned on a site through the media data, or manages a position or a state of the operator on the site identified from the media data.

Related technologies are disclosed in, for example, Japanese Laid-Open Patent Publication Nos. 2015-156662 and 2003-274049, and Japanese National Publication of International Patent Application No. 2011-517389.

SUMMARY

According to an aspect of the invention, a device selection method includes receiving a start demand of a service from a first device, acquiring positional information of the first device, estimating a service continuation time of the service, based on a history of the service continuation time corresponding to an area to which the positional information belongs by referring to the history of the service continuation time for which the service is continuously provided for each area, estimating a battery continuation time of the first device, based on a remaining battery quantity of the first device and a battery consumption rate of the first device at a time of receiving the start demand, selecting one of the first device and a second device installed in the area to which the positional information belongs, based on the service continuation time and the battery continuation time, and causing a device selected between the first device and the second device to execute sensing of media data used for the service, by a processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating one example of service use history data;

FIG. 4 is a diagram illustrating one example of battery data;

FIG. 5 is a diagram illustrating one example of device data;

FIG. 6 is a diagram illustrating one example of device use history data;

FIG. 15 is a diagram illustrating a hardware configuration example of a computer that executes a device selecting program according to the first embodiment and a second embodiment.

DESCRIPTION OF EMBODIMENTS

Since devices including a smart phone, a tablet terminal, a wearable computer, etc., are driven by a battery, there is a limit in time when the devices may operate. As a result, an IoT service may be interrupted due to battery exhaustion of the device.

Hereinafter, embodiments of a technology that may suppress the interruption of the IoT service will be described with reference to the accompanying drawings. Further, the embodiments do not limit a disclosed technology. In addition, the respective embodiments may be appropriately combined as long as they do not contradict the processing contents.

First Embodiment

IoT System

Figure 1:
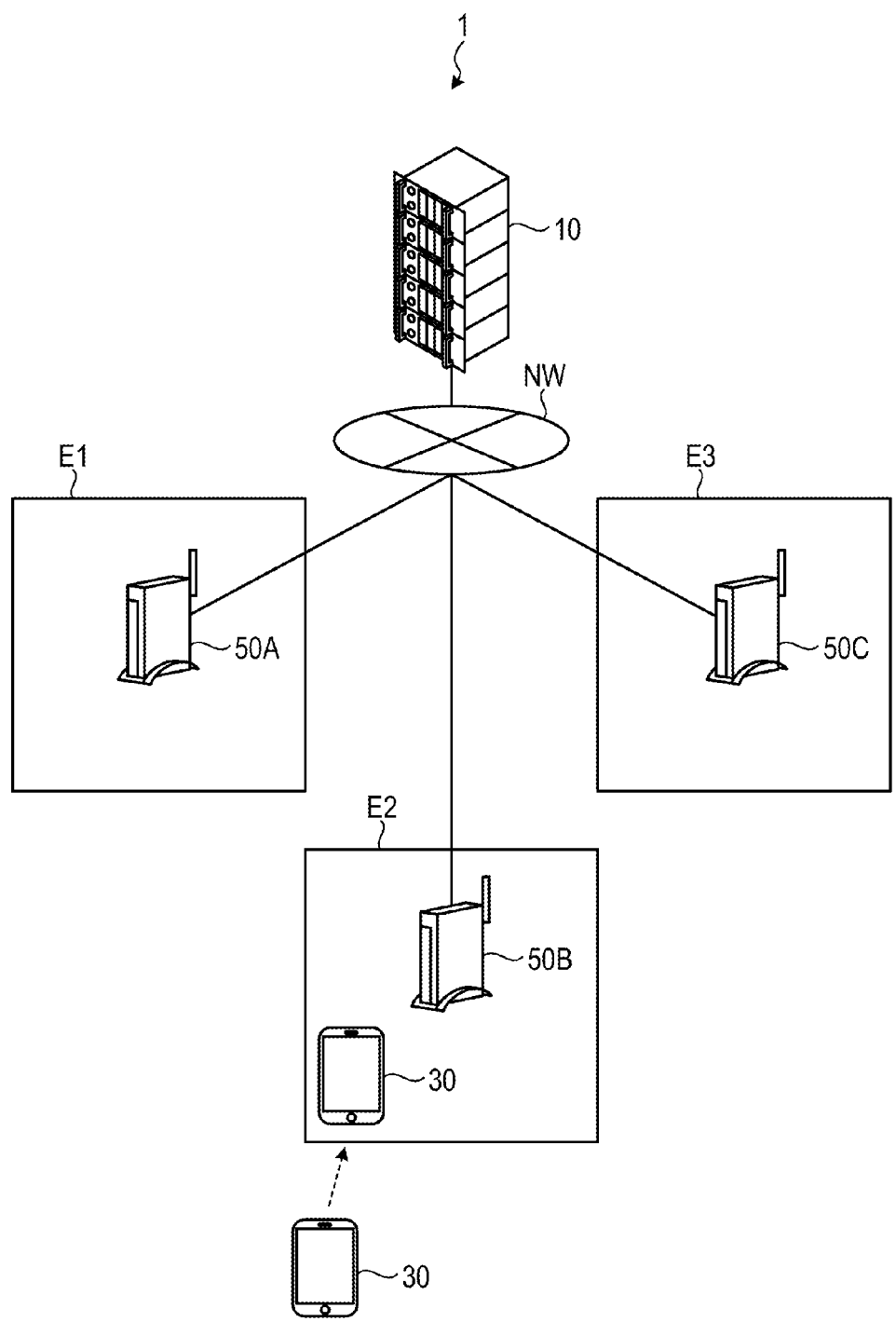
FIG. 1 is a diagram illustrating a configuration example of an IoT system according to a first embodiment.

FIG. 1 is a diagram illustrating a configuration example of an IoT system according to a first embodiment. An IoT system 1 illustrated in FIG. 1 provides a device selection service of selecting an IoT device that executes sensing of media data used for an IoT service from a user device 30 or agent devices 50A to 50C.

As illustrated in FIG. 1, the IoT system 1 includes a server apparatus 10, the user device 30, and the agent devices 50A to 50C. In FIG. 1, one user device 30 and three agent devices 50A to 50C are illustrated, but any number of user devices and agent devices may be accommodated in the server apparatus 10. Hereinafter, when the agent devices 50A to 50C are collectively named, the agent devices 50A to 50C may be referred to as "agent device 50".

The server apparatus 10, the user device 30, and the agent device 50 are connected to each other through a network NW. The network NW may be constructed by any communication network regardless of a wired or wireless network. Further, the wired and wireless communication networks may coexist in a part of the network NW. For example, the network NW may include a neighborhood base station corresponding to a cell accommodating the user device 30 or a relay device such as an access point, etc.

The server apparatus 10 is a computer that provides the device selection service to the user device 30.

As an embodiment, the server apparatus 10 may be mounted by installing a device selecting program for implementing the device selection service as package software or online software in a desired computer. For example, the server apparatus 10 may be mounted as a Web server providing the device selection service and mounted as a cloud providing the device selection service by an outsourcing.

The user device 30 is an IoT device carried by a user.

As an embodiment, as for the user device 30, a tablet terminal or a slate terminal may be adopted as well as a mobile body communication terminal such as a smart phone, a cellular phone, a personal handy phone system (PHS), or the like. The user device 30 is not limited to a handheld type portable terminal device but all IoT devices may be adopted as the user device 30 in addition to a wearable device such as a head mount display, a smart glass, a smart watch, or the like.

The user device 30 may sense media data such as voice or an image by using a sensor mounted on the user device 30. For example, a microphone mounted on the user device 30 may be used for sensing the voice. The microphone may have directionality in a specific direction or may be non-directional. Further, a camera mounted on the user device 30 may be used for sensing an image. The image picked by the camera may be a still image or a moving image.

The agent device 50 is an IoT device that executes sensing of the media data by the user device 30 as an agent.

As an embodiment, as the agent device 50, a stationary or installation type device may be adopted. For example, the camera with the microphone may be installed in an environment such as a partition or a facility from the viewpoint of implementing entrance/exit management, monitoring or authentication, etc. The camera with the microphone may execute sensing of the media data, which is executed by the user device 30 as an agent according to an instruction from the server apparatus 10. In addition, a stationary or a notebook type computer in which the microphone is connected through a microphone terminal such as, for example, a personal computer may be mounted as the agent device 50. Further, since there are also a lot of relay devices including a gateway device, etc., which may access various devices through a universal serial bus (USB) terminal, the corresponding relay devices may be mounted as the agent device 50. Furthermore, the display device may be disposed in the facility for the purpose of guidance, advertisement, issuing of a coupon, etc. A technology such as view recognition, voice recognition, or gesture recognition may be used in operating the display device. In this case, since the camera or the microphone is attached to or embedded in the display device, the display device may also be mounted as the agent device 50. As such, as the agent device 50, a device connected to an external power supply such as a commercial power supply, etc., may be adopted. Further, for easy description, a case where the agent device 50 is a stationary type or an installation type device is exemplified herein just as one example, but as described below, it is additionally mentioned that a user device carried by another user is used as the agent device 50.

Herein, the server apparatus 10 according to the embodiment selects which device of the user device 30 and the agent device 50 to sense the media data used for the IoT service according to whether a battery continuation time of the user device 30 is longer than a service continuation time, as a part of the device selection service.

That is, the user device 30 may not be particularly activated while being connected to the external power supply and is activated by power supplied from a battery. Under such a situation, when the microphone or the camera is continuously driven, the battery may be severely consumed. As a result, a remaining battery quantity of the user device 30 may run out before the IoT service ends.

In one aspect of suppressing interruption of the IoT service due to the cut-off of the battery, the server apparatus 10 makes the agent device 50 which is disposed around the user device 30 to deputize sensing of the media data. For example, in FIG. 1, as one example, three agent devices 50A, 50B, and 50C are installed in service areas E1, E2, and E3. As such, there is a situation in which three different devices of the agent devices 50A, 50B, and 50C may execute sensing of the media data in the user device 30 as agent. For example, as illustrated in FIG. 1, when the user device 30 is positioned in the service area E2, the agent device 50B may deputize sensing of the media data in the user device 30.

However, when the agent device 50 deputizes the sensing, the quality of the media data acquired by the sensing tends to decrease as compared with the case where the sensing is performed by the user device 30. One of the reasons may be that since the agent device 50 is not carried by the user but installed at a specific place, a distance from the user to the agent device 50 may be longer than the distance from the user to the user device 30. As a result, an image or voice other than a purpose, for example, a surrounding image or voice may be included in the media data, and therefore, the quality of the IoT service may deteriorate.

Therefore, the server apparatus 10 according to the embodiment makes the user device 30 sense the media data only when the user device 30 does not cause the battery cut-off until the IoT service ends. Therefore, as compared with the case where the agent device 50 senses the media data, high-quality media data may be used for the IoT service. Further, it may be suppressed that the sensing subject is switched from the user device 30 to the agent device 50 due to the battery cut-off. As a result, a series of media data may be acquired until the IoT service ends after the IoT service starts and a drop frame of the image, voice cut-off, or the like may be suppressed from occurring in the media data.

Therefore, the server apparatus 10 according to the embodiment may suppress the IoT service from being interrupted. In addition, the user device 30 which may be expected to sense the high-quality media data may be selected as much as possible as compared with the agent device 50 and the occurrence of the drop frame of the image or the voice cut-off in the media data may be suppressed.

Configuration of Server Apparatus 10

Figure 2:
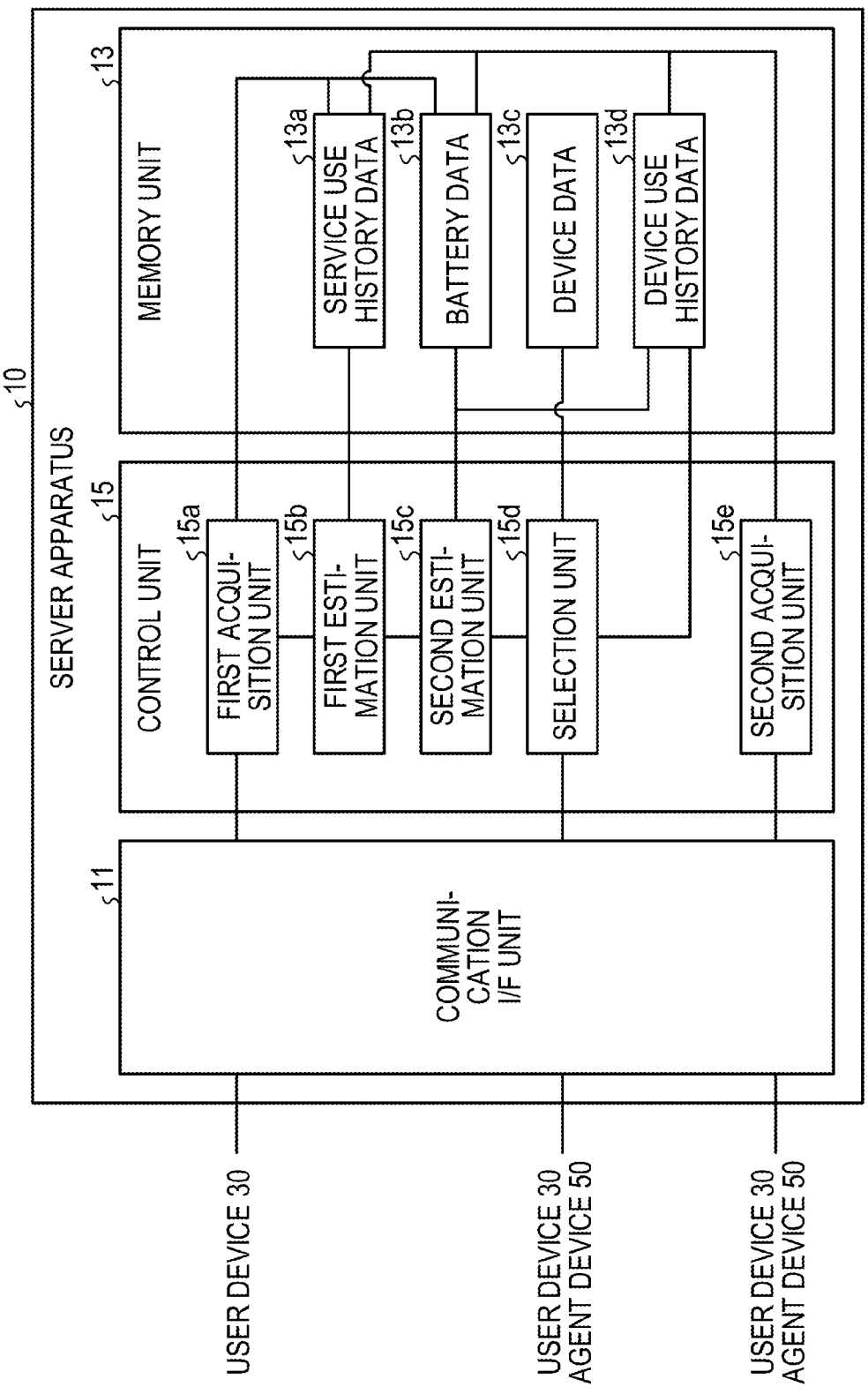
FIG. 2 is a block diagram illustrating a functional configuration of a server apparatus according to the first embodiment.

FIG. 2 is a block diagram illustrating a functional configuration of a server apparatus 10 according to the first embodiment. As illustrated in FIG. 2, the server apparatus 10 includes a communication interface (I/F) unit 11, a memory unit 13, and a control unit 15. Further, in FIG. 2, a solid line indicating a relationship of sending and receiving data is displayed, but in FIG. 2, for easy description, only a minimum part is displayed. That is, the input/output of data with respect to each processing unit is not limited to an illustrated example and the input/output of the data other than the illustrated input/output such as, for example, the input/output of the data between the processing units, between the processing unit and the data, and between the processing unit and an external device may be performed.

The communication I/F unit 11 is an interface that performs a communication control with another device such as, for example, the user device 30 or the agent device 50.

As an embodiment, as for the communication I/F unit 11, a network interface card such as a local area network (LAN) card, etc., may be adopted. For example, the communication I/F unit 11 receives a start demand or an end demand of the IoT service from the user device 30 or receives the media data sensed by the user device 30 or by the agent device 50. Further, the communication I/F unit 11 transmits a sensing instruction of media data to the user device 30 or the agent device 50.

The memory unit 13 is a memory device that stores data used for various programs including an application program for implementing the device selection service, etc., in addition to an operating system (OS) executed by the control unit 15.

As an embodiment, the memory unit 13 may be mounted as an auxiliary memory device in the server apparatus 10. For example, as for the memory unit 13, a hard disk drive (HDD), an optical disk, a solid state drive (SSD), or the like may be adopted. Further, the memory unit 13 may not be particularly mounted as the auxiliary memory device but may be mounted as a main memory device in the server apparatus 10. In this case, as for the memory unit 13, various semiconductor memory devices, for example, a random access memory (RAM) or a flash memory may be adopted.

The memory unit 13 stores service use history data 13*a*, battery data 13*b*, device data 13*c*, and device use history data 13*d* as one example of data used for the program executed by the control unit 15. The memory unit 13 may store electronic data given below in addition to these data. For example, the memory unit 13 may store information on definitions of various IoT services such as, for example, the types (the voice, the image, the voice plus the image, etc.,) of the media data used for the IoT service or an application period of the IoT service together in addition to the media data sensed by the user device 30 or the agent device 50.

The service use history data 13*a* is data regarding a use history of the IoT service. The "IoT service" described herein as one example is executed by using the user of the user device 30, furthermore, an organization such as a business operator to which the user belongs, etc., as a service subscriber and using a provider of the device selection service as a service provider. Herein, a case is exemplified in which the subjects that provide the IoT service and the device selection service are the same, but the subjects may not particularly be the same. As one example of the IoT service, a check operation support service or a conference support service may be provided. For example, the check operation support service indicates a service that displays an image photographed by the user device such as a smart glass or a head mount display which a check operator mounts on a terminal device used by a remote operation supporter as a live image, or saves the image as a log. Further, the conference support service indicates a service that saves an image of a conference captured by the user device such as a smart phone, etc., saves the voice of the conference, or saves a text recognized from the voice as a minute. Even in any service, any IoT device which may sense the media data may be used as the agent device 50. Further, all services that use the media data sensed by the IoT device such as the user device 30 or the agent device 50 may be included in a scope of the IoT service in addition to the above-described examples.

As an embodiment, as for the service use history data 13*a*, data including items including a service identification (ID), a service area, a start time, and a continuation time may be adopted. The "service ID" described herein indicates information for identifying the IoT service. Further, the "service area" may indicate an area where the IoT service is executed and as one example, the "service area" may be defined based on a location at which the agent device 50 is disposed. For example, the location of the agent device 50 may be used as a center and an area within a predetermined distance from the center, for example, 10 m may be defined as the service area, or a polygonal area defined by using the corresponding area as the center of gravity may be defined as the service area. Further, the "start time" indicates a time when the IoT service starts. In addition, the "continuation time" indicates a period until the IoT service ends after the IoT service starts and since the continuation time described herein is the history, an actual measurement value is saved.

FIG. 3 is a diagram illustrating an example of the service use history data 13*a*. In FIG. 3, as one example, entries regarding three histories are extracted and displayed. Whichever entry of a first entry from the top and a third entry from the top among the entries illustrated in FIG. 3 is a history regarding the IoT service identified by service ID "0001", while a second entry from the top is a history regarding the IoT service identified by service ID "0002". For example, the first entry from the top indicates that the IoT service identified by the service ID "0001" is executed in the service area "E2" for 2 hours and 30 minutes from 9:00 on December 11. In this regard, the third entry from the top indicates that the IoT service identified by the service ID "0001" is executed in the service area "E2" for 2 hours from 9:30 on December 13.

The battery data 13*b* is data regarding the battery.

As an embodiment, as for the battery data 13*b*, data including items including a device ID, a remaining quantity, a time, and a timing may be adopted. The "device ID" described herein indicates information for identifying the IoT device and saves the identification information of the user device 30 driven by the battery. As for the device ID, any system of identifier may be adopted. For example, an ID which is numbered by an IoT system 1 may be used and an identification number of an entity of each IoT device, for example, a serial number, etc., may be used as the device ID. Further, the "remaining quantity" indicates the remaining battery quantity of the IoT device. In addition, the "time" indicates a time when the remaining battery quantity is measured. Further, the "timing" indicates a timing when the remaining battery quantity is measured and for example, is classified into "start" or "end" of the IoT service.

FIG. 4 is a diagram illustrating one example of battery data 13*b*. In FIG. 4, as described above, the items including the device ID, the remaining quantity, the time, and the timing are included, but in this step, a state in which the entry does not exist is exemplified.

The device data 13*c* is data regarding the IoT device.

As an embodiment, as for the device data 13*c*, data including items including the device ID, the type, the service area, and a characteristic may be adopted. The "type" described herein indicates a classification of the IoT device and as one example, saves which device of the user device 30 and the agent device 50 the IoT device corresponds to. For example, when the IoT device is the user device 30, a "person" is registered in a field of the type, while when the IoT device is the agent device 50, a "place" is registered in the field of the type. Further, the "characteristic" indicates the characteristic of the IoT device and as one example, saves the level of the quality of the media data sensed by the IoT device.

FIG. 5 is a diagram illustrating one example of device data 13*c*. In FIG. 5, for easy description, the entries regarding three IoT devices are extracted and exemplified, but when the IoT devices are mounted, the entries regarding the user device 30 of which an ownership or a use right is possessed by the user which subscribes in the device selection service and the agent device 50 which exists in each service area are registered. The first entry from the top among the entries illustrated in FIG. 5 indicates that the IoT device identified by a device ID "user30" is the user device 30 and that the user device 30 may sense the high-quality media data. Further, the second entry from the top indicates that the IoT device identified by a device ID "agent50A" is an agent device 50A which exists in the service area "E1" and that the agent device 50A may sense the high-quality media data. In addition, the third entry from the top indicates that the IoT device identified by a device ID "agent50B" is an agent device 50B which exists in the service area "E2" and that the agent device 50B may sense only low-quality media data.

Further, FIG. 5 exemplifies a case in which the field of the service area included in the first entry from the top, that is, the entry of the user device 30 is set as a blank, but positional information collected from the user device 30 may be registered as a current place. In addition, information for identifying a sensing capability of the IoT device may be further included in the device data 13*c*. That is, the IoT service also includes an IoT service using the image, an IoT service using the voice, and furthermore, an IoT service using the image plus the voice. As a result, in order for the server apparatus 10 to identify the IoT device that satisfies a condition of the media data used for the IoT service receiving a request from the user device 30, that is, a condition such as the image, the voice, or the image plus the voice, the information for identifying the sensing capability of the IoT device may be included in the device data 13*c*.

The device use history data 13*d* is data regarding the history in which the IoT device is used.

As an embodiment, as for the device use history data 13*d*, data including items including the service ID, the device ID, the start time, and a consumption rate may be adopted. The "start time" described herein indicates a time when sensing the media data used for the IoT service starts. Further, the "consumption rate" indicates a battery consumption rate of the IoT device and saves a value by targeting the user device 30 which is not connected to the external power supply.

FIG. 6 is a diagram illustrating one example of device use history data 13*d*. In FIG. 6, as one example, the device use history data 13*d* corresponds to the history of the IoT device used for three IoT services illustrated in FIG. 3. The first entry from the top among the entries illustrated in FIG. 6 indicates that the IoT service identified by the service ID "0001" starts at 9:30 on December 13 by the IoT device identified by the device ID "agent50B". In the entry, the field of the consumption rate is blank. This indicates that the IoT device identified by the device ID "agent50B" is the agent device 50. Further, the second entry from the top indicates that the IoT service identified by the service ID "0002" starts at 10:00 on December 12 by the IoT device identified by the device ID "agent50A". Even in the entry, since the field of the consumption rate is blank, the IoT device identified by the device ID "agent50A" is also meant to be the agent device 50. Further, the third entry from the top indicates that the IoT service identified by the service ID "0001" starts at 9:00 on December 11 by the IoT device identified by the device ID "user30". In the entry, a value of 20%/h is stored in the field of the consumption rate. This indicates that the IoT device identified by the device ID "user 30" is the user device 30 and a battery of 20% per 1 hour is consumed by a use for the IoT service identified by the service ID "0001".

Further, in FIG. 3 to FIG. 6, a case in which the respective data of the service use history data 13*a*, the battery data 13*b*, the device data 13*c*, and the device use history data 13*d* is stored in the memory unit 13 in a table format is exemplified, but the present disclosure is not limited thereto. For example, each data may be data described in a tag format by a markup language such as extensible markup language (XML), etc., or data described by a comma or line break, such as comma-separated values (CSV).

The control unit 15 has an internal memory storing various programs or control data and executes various processing thereby.

As an embodiment, the control unit 15 is mounted as a central processing device, so-called, a central processing unit (CPU). Further, the control unit 15 may not particularly be mounted as the central processing unit but mounted as a micro processing unit (MPU). In addition, the control unit 15 may be implemented even by a hard-wired logic such as an application specific integrated circuit (ASIC) or a field programmable gate array (FPGA).

The control unit 15 develops the device selecting program as the process on a work area of the RAM such as a dynamic random access memory (DRAM) or a static random access memory (SRAM) mounted as a main memory device (not illustrated) to virtually implement the following processing unit.

For example, the control unit 15 includes a first acquisition unit 15*a*, a first estimation unit 15*b*, a second estimation unit 15*c*, a selection unit 15*d*, and a second acquisition unit 15*e* as illustrated in FIG. 2.

Both the first acquisition unit 15*a* and the second acquisition unit 15*e* are processing units that acquire various information from the user device 30, but timings when the information is acquired from the user device 30 are different from each other. That is, the first acquisition unit 15*a* acquires the information in a step in which the start of the IoT service is demanded from the user device 30, while the second acquisition unit 15*e* acquires the information in a step in which the end of the IoT service is demanded from the user device 30. Further, it is assumed that the second acquisition unit 15*e* is described after the selection unit 15*d* is described according to a time series in which the IoT service is executed.

As an embodiment, the first acquisition unit 15*a* starts to operate when receiving the start demand of the IoT service from the user device 30. The start demand of the IoT service is received together with, for example, designation of the IoT service, for example, designation of the service ID or a service name, etc., in order to identify the IoT service which the user desires to provide by the service apparatus 10.

When the start demand of the IoT service is received as described above, the first acquisition unit 15*a* acquires as the start time a time when the start demand of the IoT service is received from a time stamp managed by the OS executed by the control unit 15, etc. Continuously, the first acquisition unit 15*a* acquires the positional information from the user device 30. For example, the first acquisition unit 15*a* may acquire a latitude and a longitude measured by a global positioning system (GPS) mounted on the user device 30 as the positional information of the user device 30. Besides, the first acquisition unit 15a may acquire the positional information of a base station of a cell accommodating the user device 30 such as, for example, an access point, etc., from the user device 30. The positional information of the access point may be used as the positional information of the user device 30 as it is and the positional information of the user device 30 may be acquired by using a distance between the user device 30 and the access point, which is calculated from a radio wave strength of the user device 30, etc.

Subsequently, the first acquisition unit 15a identifies the service area including the positional information of the user device 30 among the service areas of the agent device 50 included in the device data 13c stored in the memory unit 13. For example, the first acquisition unit 15a determines whether the positional information of the user device 30 is included in the area defined as the service area every service area of the agent device 50. As a result of the determination, when the service area exists, which includes the positional information of the user device 30, the agent device 50 corresponding to the service area is extracted as an option of the sensing device. Further, when the service area does not exist, which includes the positional information of the user device 30, it is determined that the agent device 50 which may sense the media data instead of the user device 30 does not exist around the user device 30. In this case, the user device 30 is selected as a sensing device which senses the media data by the selection unit 15d to be described below.

In addition, the first acquisition unit 15a prepares a new entry in the service use history data 13a stored in the memory unit 13 and thereafter, registers the service ID, the service area, and the start time, corresponding to each other in the entry. For example, the first acquisition unit 15a registers the service ID received together with the start demand of the IoT service in the field of the service ID, registers the service area including the positional information of the user device 30 in the field of the service area, and registers the time of receiving the start demand of the IoT service as the start time in the field of the star time.

Thereafter, the first acquisition unit 15a acquires the remaining battery quantity from the user device 30. For example, the first acquisition unit 15a may acquire the remaining battery quantity according to an application programming interface (API) provided by the OS or a battery driver which operates on the user device 30. Then, the first acquisition unit 15a prepares the new entry in the battery data 13b stored in the memory unit 13 and thereafter, registers the device ID, the remaining quantity, the time, and the timing, corresponding to each other in the entry. For example, the first acquisition unit 15a registers the device ID of the user device 30 performing the start demand of the IoT service in the field of the device ID, registers the remaining battery quantity acquired from the user device 30 in the field of the remaining quantity, registers the time of receiving the start demand of the IoT service as the start time in the field of the time, and registers the start in the field of the timing because the start demand of the IoT service is received.

The first estimation unit 15b is a processing unit that estimates the continuation time of the IoT service. Hereinafter, the continuation time of the IoT service may be described as a "service continuation time".

As an embodiment, the first estimation unit 15b extracts the entry which coincides with the service ID received together with the start demand of the IoT service and further coincides with the service area including the positional information of the user device 30 among the entries of the service use history data 13a stored in the memory unit 13. At this time, when multiple entries are extracted from the service use history data 13a, the first estimation unit 15b performs predetermined statistical processing for the continuation time included in each entry to calculate a representative value of the continuation time. For example, the first estimation unit 15b averages the continuation time included in each entry to calculate an estimation value of the continuation time. As a result, the calculated estimation value of the continuation time is used in subsequent processing as the service continuation time. The entry in which the service ID and the service area are common is extracted in order to use the history in which the IoT service which is the same as the IoT service of which the start is demanded is executed in the same service area for estimating the service continuation time, and as a result, the entry is extracted because a possibility that even when the IoT service is executed at this time, a continuation time equivalent to the continuation time of the history will be reproduced may be anticipated.

Further, herein, as one example, the case of extracting the entry under the condition of coincidence of the service ID and the service area is exemplified, but the extraction condition of the entry may not particularly be an AND condition, but may be an OR condition. For example, the entry which coincides with the service ID may be extracted, the entry which coincides with the service area may be extracted, and the entry which coincides with at least one of the service ID and the service area may be extracted. Besides, an additional condition may be added to the extraction condition of the entry. For example, although the service ID and the service area are common, there may be an individual difference in service continuation time depending on the user. For this reason, the identification information of the user such as, for example, the user ID may be added to the field of the service use history data 13a and the entry having a more common device ID may be extracted. Further, there may be a difference in service continuation time depending on the IoT device used by the user. For this reason, the identification information of the IoT device used for the IoT service, that is, the device ID may be added to the entry of the service use history data 13a and the entry having a more common device ID may be extracted.

The second estimation unit 15c is a processing unit that estimates the battery continuation time of the IoT device.

As an embodiment, the second estimation unit 15c extracts the entry which coincides with the service ID received together with the start demand of the IoT service and further, coincides with the device ID of the user device 30 which demands the start of the IoT service among the entries of the device use history data 13d stored in the memory unit 13. At this time, when the entry which coincides with the service ID and the device ID is successfully extracted, the second estimation unit 15c estimates the battery continuation time as shown in branch a given below. Further, when the entry which coincides with the service ID and the device ID is not successfully extracted, it is determined that there is no history in which the IoT service of which the start demand is performed is executed by using the user device 30 of a start demander. In this case, the second estimation unit 15c extracts the entry which coincides with the device ID of the user device 30 which demands the start of the IoT service among the entries of the device use history data 13d by easing the extraction condition of the entry. In addition, when the entry which coincides with the device ID is successfully extracted, the second estimation unit 15c estimates the battery continuation time as shown in branch b given below. Meanwhile, when the entry which coincides with the device ID is not successfully extracted, it is determined that there is no history in which the IoT service is executed by using the user device 30 of the start demander. In this case, the second estimation unit 15c estimates the battery continuation time as shown in branch c given below.

Branch A

The second estimation unit 15c determines whether multiple entries which coincide with the service ID and the device ID are provided. In this case, when multiple entries which coincide with the service ID and the device ID are provided, the second estimation unit 15c performs predetermined statistical processing for the battery consumption rate included in each entry to calculate the representative value of the battery consumption rate. For example, the second estimation unit 15c performs a calculation of averaging the battery consumption rate included in each entry to calculate an average value of the battery consumption rate. Meanwhile, when one entry which coincides with the service ID and the device ID is provided, the battery consumption rate of the entry is just used as the representative value. By using the representative value of the battery consumption rate, which is calculated as such, the second estimation unit 15c estimates the battery continuation time of the user device 30 which demands the start of the IoT service. For example, the second estimation unit 15c performs a calculation of dividing the remaining battery quantity of the user device 30 by the average value of the battery consumption rate to calculate the estimation value of the battery continuation time. The entry in which the service ID and the service area are common is extracted in order to use the battery consumption rate of the history in which the same IoT device is used in the IoT service which is the same as the IoT service of which the start is demanded for estimating the battery continuation time, and as a result, the entry is extracted because of an anticipated possibility that even when the IoT service is executed at this time, the battery consumption rate equivalent to the battery consumption rate of the history will be reproduced.

Branch B

The second estimation unit 15c determines whether multiple entries which coincide with the device ID are provided. In this case, when multiple entries which coincide with the device ID are provided, the second estimation unit 15c performs predetermined statistical processing for the battery consumption rate included in each entry to calculate the representative value of the battery consumption rate. For example, the second estimation unit 15c performs a calculation of averaging the battery consumption rate included in each entry to calculate the average value of the battery consumption rate. Meanwhile, when one entry which coincides with the device ID is provided, the battery consumption rate of the entry is just used as the representative value. By using the representative value of the battery consumption rate, which is calculated as such, the second estimation unit 15c estimates the battery continuation time of the user device 30 which demands the start of the IoT service. For example, the second estimation unit 15c performs a calculation of dividing the remaining battery quantity of the user device 30 by the average value of the battery consumption rate to calculate the estimation value of the battery continuation time. The entry in which the device ID is common is extracted because the history in which the same IoT device is used is used for estimating the battery continuation time in spite of the history of the IoT service different from the IoT service of which the start is demanded, and as a result, constant reproducibility may be expected even when the IoT service is executed at the current time.

Branch C

The second estimation unit 15c estimates the battery continuation time of the user device 30 which demands the start of the IoT service by using a predetermined set value of the battery consumption rate. For example, by referring to catalogue data corresponding to the battery consumption rate announced as a catalogue specification of a product for each product name of the user device 30, the second estimation unit 15c may call the set value of the battery consumption rate corresponding to the user device 30 that demands the start of the IoT service.

Further, the case of extracting the entry under the condition of the coincidence of the service ID and the device ID is exemplified herein as one example, but the extraction condition of the entry may not particularly be the AND condition and may be the OR condition. For example, the entry which coincides with the service ID may be extracted, the entry which coincides with the device ID may be extracted, and the entry which coincides with at least one of the service ID and the device ID may be extracted. In addition, the additional condition may be added to the extraction condition of the entry. For example, there is a case where the battery consumption rate varies depending on the place even though the device ID and the service ID are common, such as a case where a radio wave of a wireless network is weak, a case where power consumption applied to use of a service using communication increases, etc., at a specific place. For this reason, the field of the service area may be added to the entry of the device use history data 13d and the entry having a more common service area may be extracted. Further, the battery consumption rate may vary depending on a using method of the user who uses the device. For this reason, the field of the user ID may be added to the entry of the device use history data 13d and the entry having a more common user ID may be extracted.

The selection unit 15d is a processing unit that selects any device of the user device 30 and the agent device 50 as the sensing device.

As an embodiment, the selection unit 15d compares a magnitude relationship between the battery continuation time estimated by the second estimation unit 15c and the service continuation time estimated by the first estimation unit 15b. That is, the selection unit 15d determines whether the battery continuation time is longer than the service continuation time. Herein, when the battery continuation time is longer than the service continuation time, it may be determined that a possibility that the IoT service will be interrupted due to the battery cut-off even though the user device 30 senses the media data is low. In this case, the selection unit 15d selects the user device 30 as the sensing device. Meanwhile, when the battery continuation time is not longer than the service continuation time, it may be determined that a possibility that the IoT service will be interrupted due to the battery cut-off is high. In this case, the selection unit 15d selects the agent device 50 corresponding to the service area including the positional information of the user device 30 as the sensing device.

After the sensing device is selected as such, the selection unit 15d prepares the new entry in the device use history data 13d stored in the memory unit 13 and thereafter, registers the service ID, the device ID, and the start time, corresponding to each other in the entry. For example, the selection unit 15d registers the service ID received together with the start demand of the IoT service in the field of the service ID, registers the device ID of the IoT device selected as the sensing device in the field of the device ID, and registers the time of receiving the start demand of the IoT service as the start time in the field of the star time. In this step, since only the residual battery quantity of a 1-hour section is clear, the field of the consumption rate is left blank.

Thereafter, the selection unit 15*d* instructs the sensing device to sense and transmit the media data. Thereafter, stream data of the voice or image transmitted from the sensing device is decoded and the decoded media data is output to a predetermined output destination, for example, the application program corresponding to the IoT service. As a result, the IoT service is provided by using the media data by the application program corresponding to the IoT service.

Further, when multiple agent devices 50 exist, one is selected among the multiple agent devices. An alternative selection criterion is not limited to a specific criterion, but as one example, the agent device 50 having the highest quality stored in the field of the characteristic of the device data 13*c* may be selected among the multiple agent devices 50.

The second acquisition unit 15*e* is a processing unit that acquires various information from the user device 30.

As an embodiment, when the selection unit 15*d* selects the sensing device, the second acquisition unit 15*e* waits for receiving an end demand from the user device 30 that demands the start of the IoT service of which providing starts by selecting the sensing device. In addition, the second acquisition unit 15*e* starts to operate when receiving the end demand of the IoT service from the user device 30.

When the end demand of the IoT service is received as such, the second acquisition unit 15*e* instructs the sensing device selected by the selection unit 15*d* to end sensing and transmitting the media data. As a result, providing the IoT service ends. Subsequently, the second acquisition unit 15*e* acquires the time of receiving the end demand of the IoT service from the time stamp managed by the OS executed by the control unit 15, etc., as the end time. In addition, the second acquisition unit 15*e* extracts the entry which coincides with the service ID received together with the end demand of the IoT service and which coincides with the service area identified at the time of starting the IoT service and further, in which the field of the continuation time is blank among the entries of the service use history data 13*a* stored in the memory unit 13. Herein, the service area identified at the time of starting the IoT service is used just as one example, but the positional information of the user device 30 may be acquired at the time of the end to identify again the service area to which the positional information belongs. Thereafter, the second acquisition unit 15*e* compares the extracted start time included in the entry and the acquired end time with each other. For example, the second acquisition unit 15*e* performs a calculation of subtracting the start time from the end time, that is, the end time-the start time to calculate the continuation time of the IoT service of which the end demand is received. Thereafter, the second acquisition unit 15*e* registers the calculated continuation time in the field of the continuation time of the entry of the service use history data 13*a* stored in the memory unit 13. Further, the case where the continuation time is calculated from a difference between the start time and the end time is exemplified herein, but a time elapse may be measured from the start time to derive the continuation time.

Subsequently, the second acquisition unit 15*e* extracts the entry of the device ID possessed by the sensing device selected by the selection unit 15*d* among the entries of the device data 13*c* stored in the memory unit 13. In addition, the second acquisition unit 15*e* determines whether the field of the type included in the extracted entry is "person", that is, whether the sensing device is the user device 30. Further, when the sensing device is not the user device 30, that is, when the sensing device is the agent device 50, the agent device 50 is connected to the external power supply, and as a result, the battery consumption rate may not particularly be calculated.

Meanwhile, when the sensing device is the user device 30, the processing set forth below is executed in order to leave the battery consumption rate of the user device 30 as the history. That is, the second acquisition unit 15*e* extracts the entry which includes a pair of the service ID of the IoT service of which the end demand is performed and the device ID possessed by the sensing device selected by the selection unit 15*d* and further, coincides with the start time of the IoT service among the entries of the device use history data 13*d* stored in the memory unit 13. Subsequently, the second acquisition unit 15*e* prepares the new entry in the battery data 13*b* stored in the memory unit 13 and thereafter, registers the remaining battery quantity acquired from the user device 30 which demands the end of the IoT service. For example, the second acquisition unit 15*e* registers the device ID of the user device 30 performing the end demand of the IoT service in the field of the device ID, registers the remaining battery quantity acquired from the user device 30 in the field of the remaining quantity, and registers the end in the field of the timing because the end demand of the IoT service is received.

Then, the second acquisition unit 15*e* extracts the entry which coincides with the device ID possessed by the sensing device selected by the selection unit 15*d* and further, in which the field of the timing is the start and which coincides with the start time of the IoT service among the entries of the battery data 13*b*. Thereafter, the second acquisition unit 15*e* obtains the difference between the previously registered remaining battery quantity and the remaining battery quantity included in the extracted entry and calculates the battery consumption rate from the previously acquired continuation time. For example, the second acquisition unit 15*e* performs a calculation of dividing a battery consumption acquired by subtracting the remaining battery quantity registered at the time of the end from the remaining battery quantity registered at the time of starting the IoT service by the acquired continuation time, that is, a calculation of (the remaining battery quantity at the time of the start-the remaining battery quantity at the time of the end)/the continuation time. As a result, the battery consumption rate is obtained. Thereafter, the second acquisition unit 15*e* registers the calculated battery consumption rate in the entry which includes a pair of the service ID of the IoT service of which the end demand is performed and the device ID possessed by the sensing device selected by the selection unit 15*d* and further, in which the field of the consumption rate is blank among the entries of the device use history data 13*d* stored in the memory unit 13.

Data Transition at the Time of Service Start

Next, a data transition used for selecting the sensing device at the time of demanding the start of the IoT service is described with reference to FIG. 7 to FIG. 10. FIG. 7 to FIG. 10 are diagrams each illustrating one example of the data transition. In FIG. 7 to FIG. 10, when the service use history data 13*a*, the battery data 13*b*, the device data 13*c*, and the device use history data 13*d* at the time of receiving the demand request of the IoT service are assumed, corresponding to the states of the data illustrated in FIG. 3 to FIG. 6, a transition therefrom is illustrated.

For example, when the start demand of the IoT service identified by the service ID "0001" is received from the user device 30 identified by the device ID "user30", the positional information and the remaining battery quantity are acquired from the user device 30. As a result, the service use history data 13*a* illustrated in FIG. 3 and the battery data 13*b* illustrated in FIG. 4 are transited to the service use history data 13*a* and the battery data 13*b* illustrated in FIG. 7.

Figure 7:
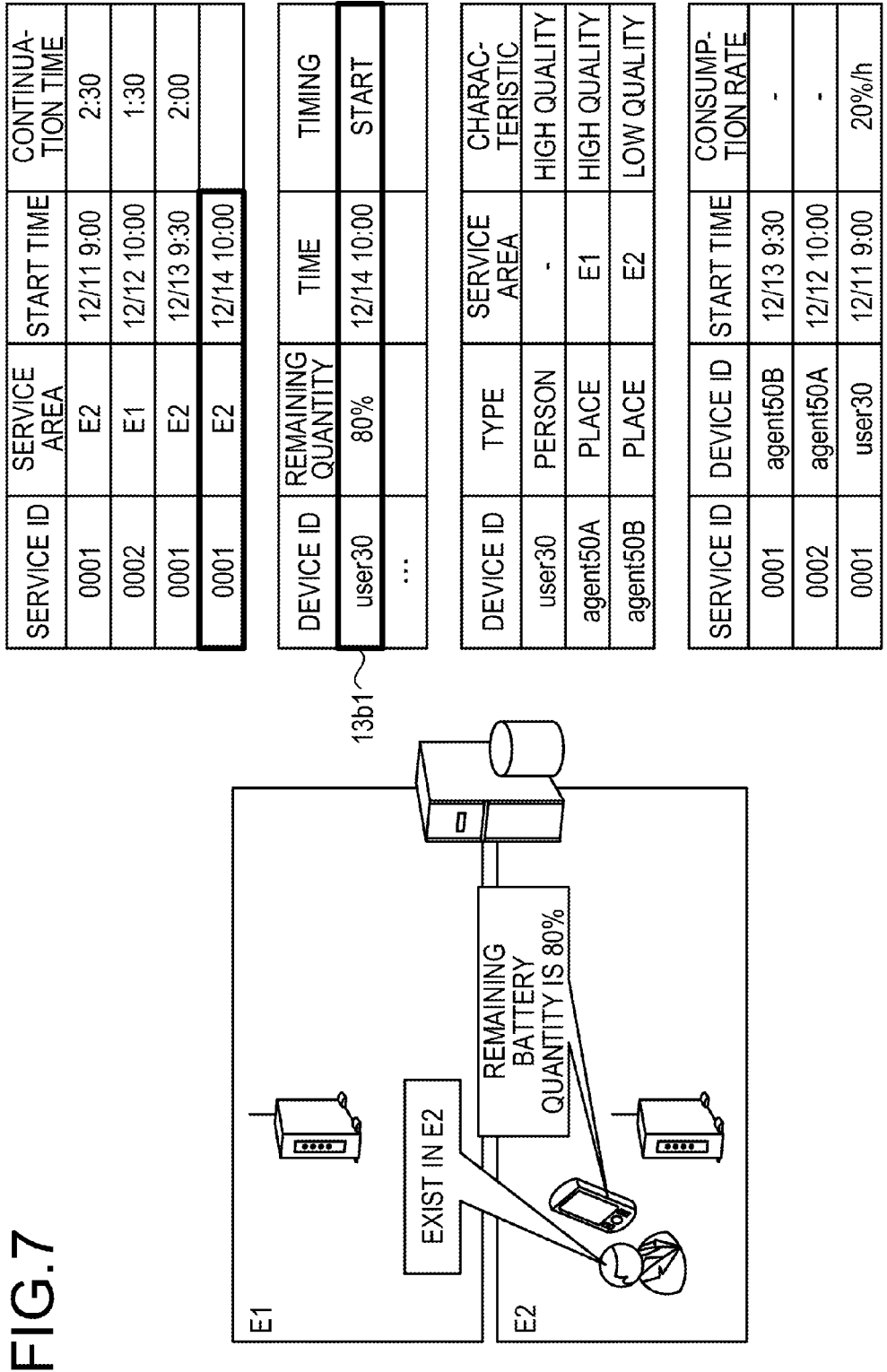
FIG. 7 is a diagram illustrating one example of data transition.

That is, in a step in which the service area to which the positional information of the user device 30 belongs is identified by "E2", the new entry is prepared in the service use history data 13*a* as illustrated in FIG. 7. The service ID "0001" received together with the start demand of the IoT service is registered in the field of the service ID in the entry which is newly prepared. Further, the service area "E2" identified from the positional information of the user device 30 is registered in the field of the service area. In addition, "10:00 on December 14" which is the time of receiving the start demand of the IoT service is registered in the field of the start time as the start time.

Further, in a step in which "80%" is acquired as the remaining battery quantity of the user device 30, a new entry 13*b*1 is prepared in the battery data 13*b* as illustrated in FIG. 7. In the entry 13*b*1 which is newly prepared as such, the device ID "user30" of the user device 30 performing the start demand of the IoT service is registered in the field of the device ID. Further, "80%" is registered in the field of the remaining quantity as the remaining battery quantity acquired from the user device 30 and "10:00 on December 14" which is the time of receiving the start demand of the IoT service is registered in the field of the time as the start time. In addition, since the start demand of the IoT service is received, "start" is registered in the field of the timing.

Figure 8:
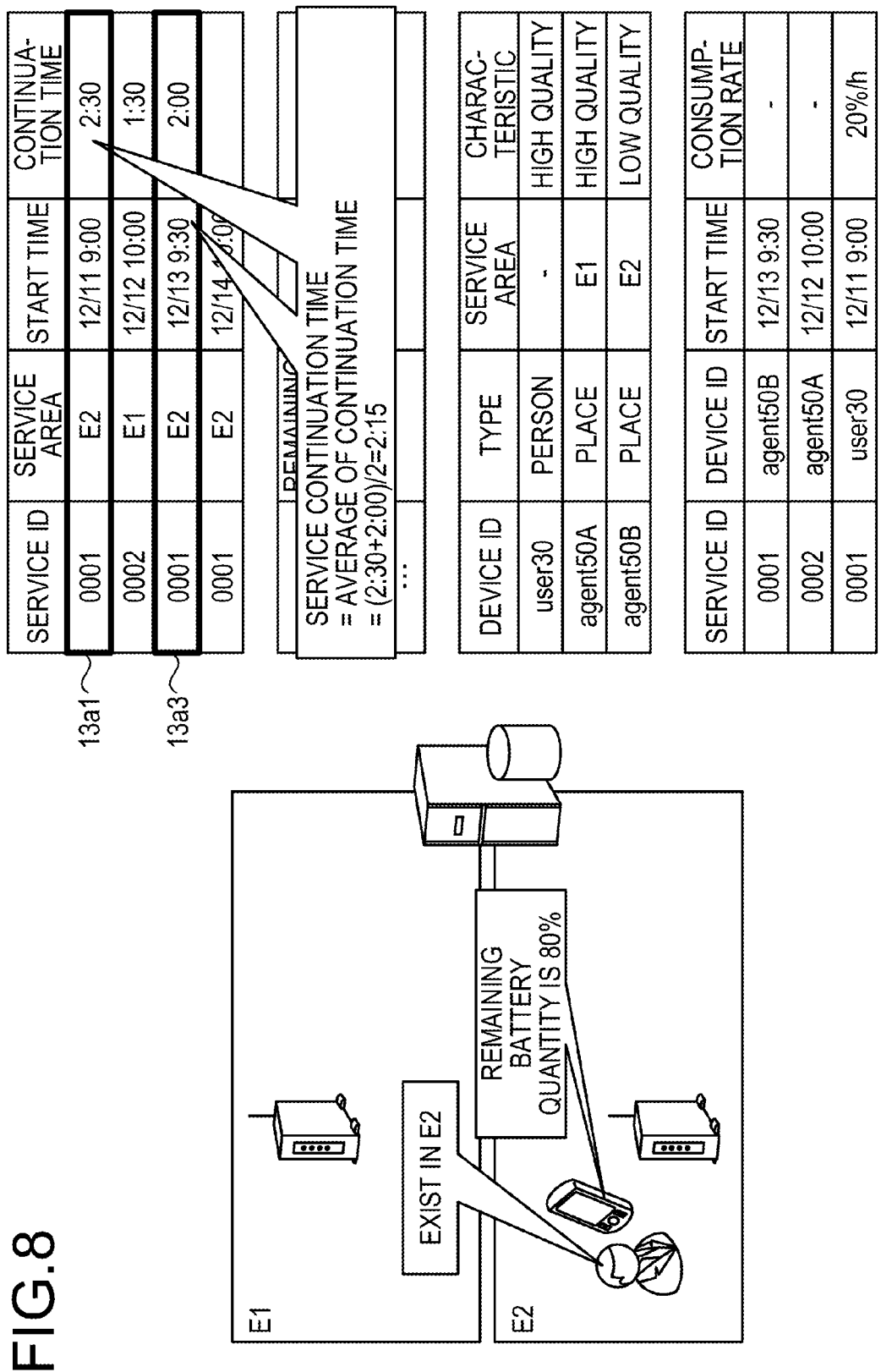
FIG. 8 is a diagram illustrating one example of data transition.

Thereafter, in a step in which the service continuation time is estimated, two entries which are enclosed by a bold rectangle in FIG. 8 are referred to among the entries of the service use history data 13*a*. That is, two entries which include the service ID "0001" received together with the start demand of the IoT service and further, include the service area "E2" including the positional information of the user device 30, that is, a first entry 13*a*1 from the top and a third entry 13*a*3 from the top are referred to. Thereafter, an average of "2 hours and 30 minutes" which is the continuation time of the first entry 13*a*1 from the top and "2 hours" which is the continuation time of the third entry 13*a*3 from the top, that is, "(2 hours and 30 minutes+2 hours)/2" is calculated to estimate "2 hours and 15 minutes" as the service continuation time.

Figure 9:
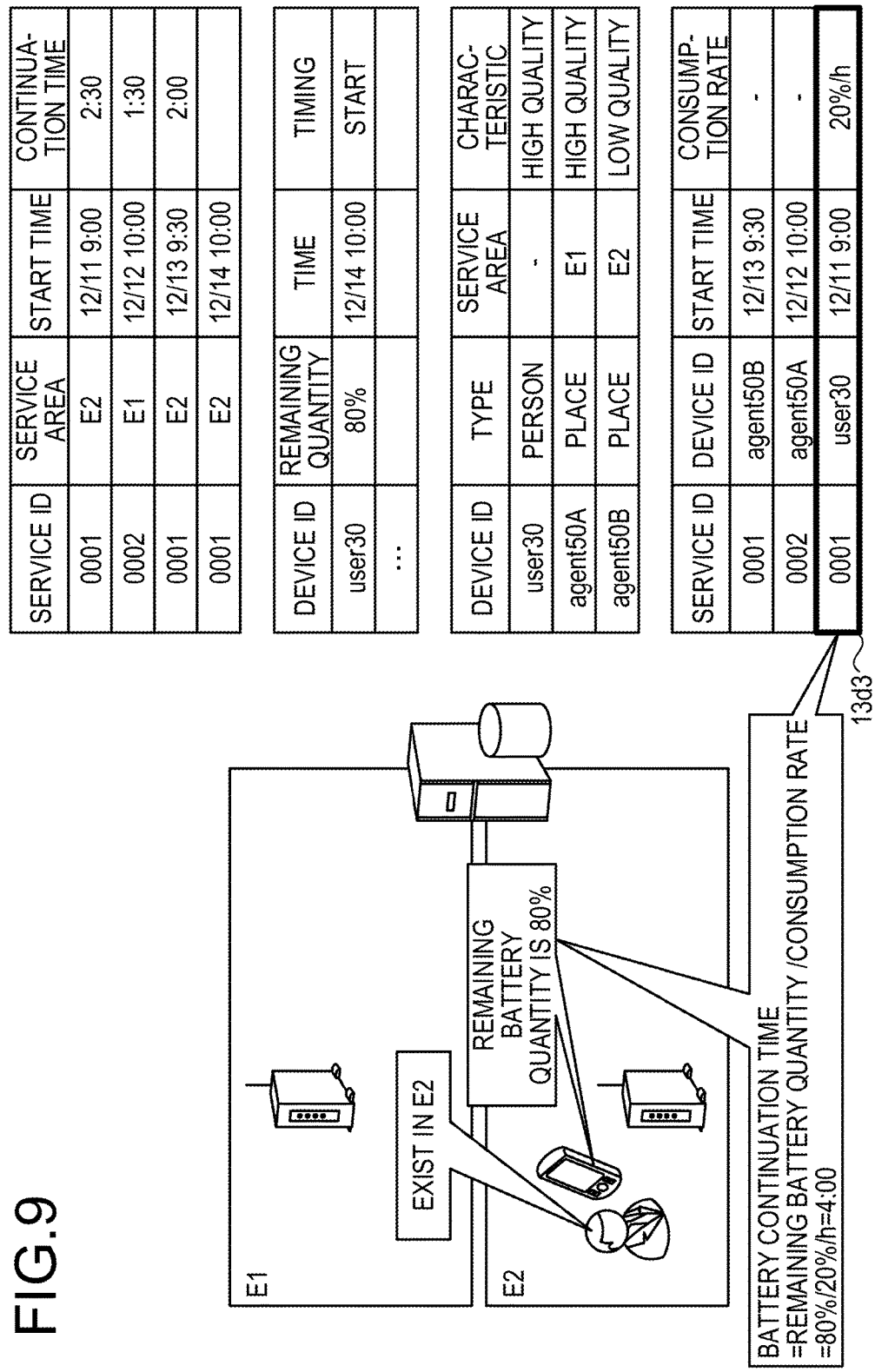
FIG. 9 is a diagram illustrating one example of data transition.

Further, in a step in which the battery continuation time of the user device 30 is estimated, the entry which is enclosed by the bold rectangle in FIG. 9 is referred to among the entries of the device use history data 13*d*. That is, the entry which includes the service ID "0001" received together with the start demand of the IoT service and further, includes the device ID "user30" possessed by the user device 30 which demands the start of the IoT service, that is, the third entry 13*d*3 from the top is extracted. Thereafter, a calculation of dividing the remaining battery quantity "80%" of the user device 30 identified by the device ID "user30" by the device ID "user30" by the battery consumption rate "20%/h" of the third entry 13*d*3 from the top, that is, a calculation of "80% (20%/h)" is performed to estimate "4 hours" as the battery continuation time.

Figure 10:
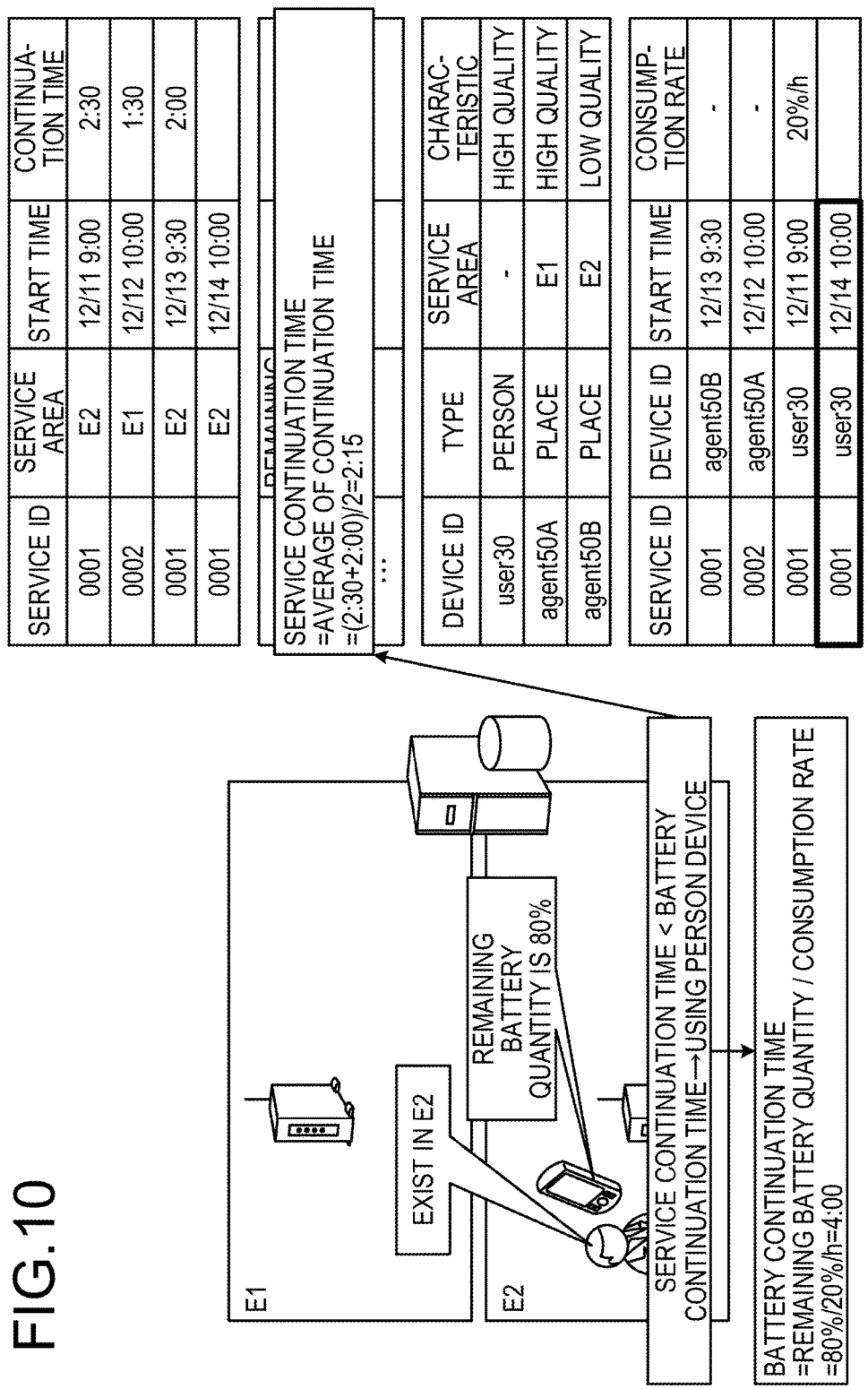
FIG. 10 is a diagram illustrating one example of data transition.

After the service continuation time and the battery continuation time are estimated as such, the magnitude relationship between the service continuation time and the battery continuation time is compared as illustrated in FIG. 10. In this example, since the battery continuation time is "4 hours" which is longer than the service continuation time of "2 hours and 15 minutes", it may be determined that a possibility that the IoT service will be interrupted due to the battery cut-off is low even though the user device 30 senses the media data. In this case, the user device 30 is selected as the sensing device. Thereafter, as illustrated in FIG. 10, the new entry is prepared in the device use history data 13*d*. The service ID "0001" received together with the start demand of the IoT service is registered in the field of the service ID in the entry which is newly prepared. Further, the device ID "user30" possessed by the IoT device selected as the sensing device is registered in the field of the device ID. In addition, "10:00 on December 14" which is the time of receiving the start demand of the IoT service is registered in the field of the start time as the start time.

Further, in this example, the case where the battery continuation time is longer than the service continuation time is described, but in the following case, the battery continuation time becomes not longer than the service continuation time and the agent device 50 is selected as the sensing device.

For example, as the battery consumption rate of the user device 30 increases, the battery continuation time decreases and a possibility that the agent device 50 will be selected increases. For example, when the battery consumption rate increases up to 40%/h, the battery continuation time becomes two hours by calculating "80%÷(40%/h)". In this case, since the battery continuation time "2 hours"<the service continuation time "2 hours and 15 minutes", the agent device 50B corresponding to the service area "E2", that is, the device ID "agent50B" is selected as the sensing device. Further, as the remaining battery quantity of the user device 30 decreases, the battery continuation time decreases and the possibility that the agent device 50 will be selected increases. For example, when the remaining battery quantity is set to 35%, the battery continuation time becomes 1 hour and 45 minutes by calculating "35%÷(20%/h)". In this case, since the battery continuation time "1 hour and 45 minutes" <the service continuation time "2 hours and 15 minutes", the agent device 50B corresponding to the service area "E2" is selected as the sensing device.

Figure 11:
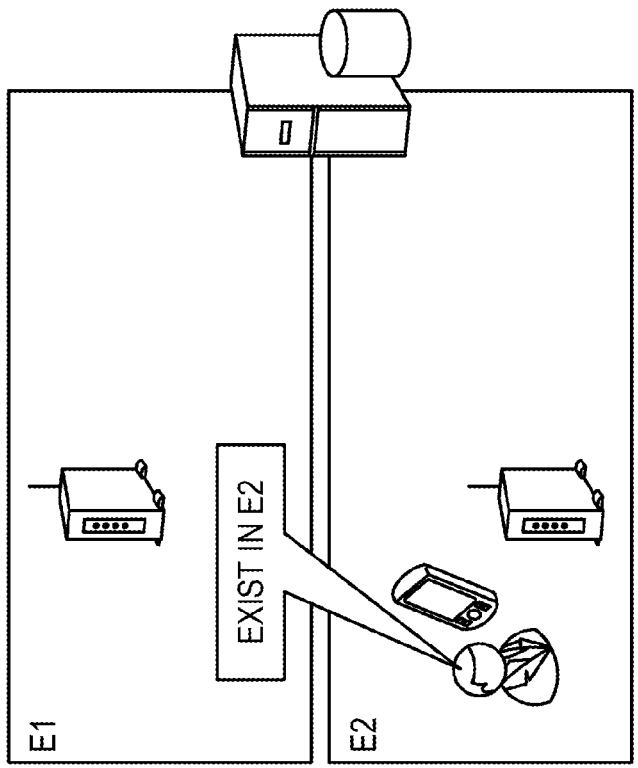
FIG. 11 is a diagram illustrating one example of data transition.
Figure 12:
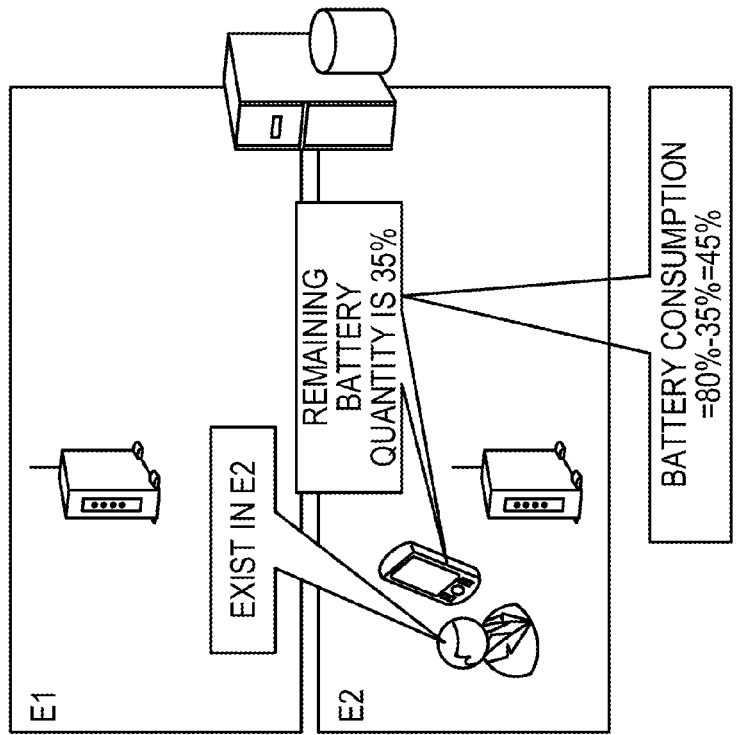
FIG. 12 is a diagram illustrating one example of data transition.

Further, as the service continuation time increases, the possibility that the agent device 50 will be selected increases. For example, when the service continuation time is more than 4 hours, the battery continuation time increases, and as a result, the agent device 50B corresponding to the service area "E2" is selected as the sensing device. Data transition at the time of service end Next, the data transition at the time of demanding the end of the IoT service is described with reference to FIG. 11 and FIG. 12. FIG. 11 and FIG. 12 are diagrams illustrating one example of the data transition. In FIG. 11 and FIG. 12, when it is assumed that the service use history data 13*a*, the battery data 13*b*, the device data 13*c*, and the device use history data 13*d* at the time of receiving the demand request of the IoT service correspond to the states of the data illustrated in FIG. 10, a transition therefrom is illustrated.

For example, when the end demand of the IoT service identified by the service ID "0001" is received from the user device 30 identified by the device ID "user30", the continuation time is calculated from the difference between the start time and the end time of the IoT service. In this case, when the time of receiving the end demand of the IoT service is set to 12:00, the continuation time is calculated as 2 hours by calculating the end time–the start time, that is, "12:00-10:00" as illustrated in FIG. 11. The calculated continuation time "2 hours" is added to the entry of the service use history data 13*a*.

Further, since the user device 30 identified by the device ID "user30" is selected as the sensing device, the battery consumption rate in the IoT service is also calculated. That is, as illustrated in FIG. 12, the new entry is prepared in the battery data 13b and thereafter, the remaining battery quantity "35%" acquired from the user device 30 which demands the end of the IoT service is registered. In addition, the battery consumption is calculated as 45% by a calculation of subtracting the remaining battery quantity "35%" at the time of ending the IoT service from the remaining battery quantity "80%" at the time of starting the IoT service, that is, a calculation of "80%-35%". A calculation of dividing the calculated battery consumption "45%" by the acquired continuation time "2 hours", that is, a calculation of "45% ÷2h" is performed. As a result, the battery consumption rate is obtained as 22.5%/h. Then, the battery consumption rate "22.5%/h" is added to the entry of the device use history data 13d.

Flow of Processing

Next, a flow of processing of the server apparatus 10 according to the embodiment is described. Further, herein, (1) device selecting processing performed at the time of starting the IoT service is described and thereafter, (2) history update processing performed at the time of ending the IoT service is described.

(1) Device Selecting Processing

Figure 13:
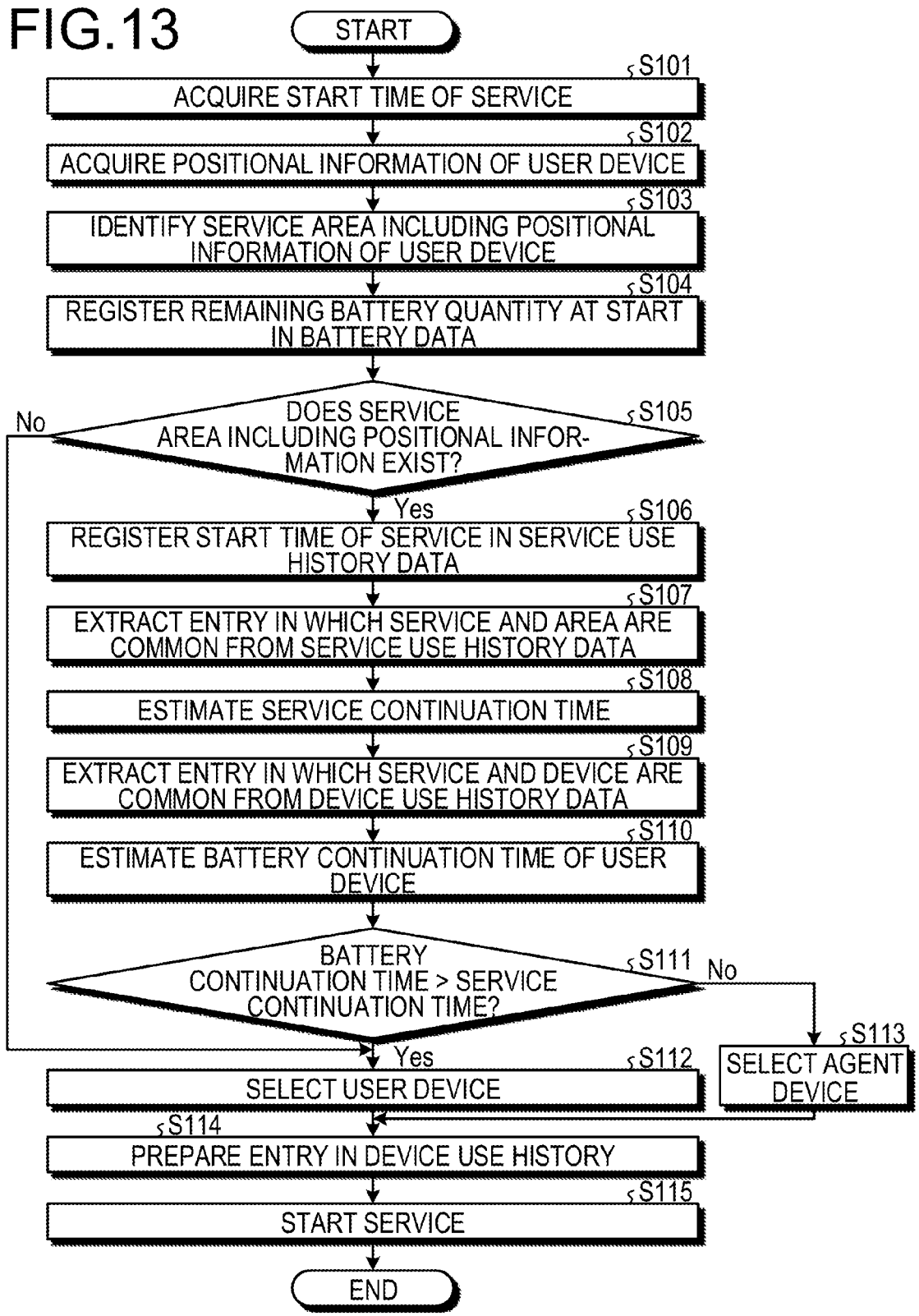
FIG. 13 is a flowchart illustrating a sequence of device selecting processing according to the first embodiment.

FIG. 13 is a flowchart illustrating a sequence of device selecting processing according to the first embodiment. The processing starts when the start demand of the IoT service is received from the user device 30 as one example.

As illustrated in FIG. 13, the first acquisition unit 15a acquires as the start time the time when the start demand of the IoT service is received from the time stamp managed by the OS executed by the control unit 15, etc. (operation S101).

In addition, the first acquisition unit 15a acquires the positional information from the user device 30 (operation S102). Subsequently, the first acquisition unit 15a identifies the service area including the positional information of the user device 30, which is acquired in operation S102 among the service areas of the agent device 50 included in the device data 13c stored in the memory unit 13 (operation S103).

Thereafter, the first acquisition unit 15a registers the device ID of the user device 30 performing the start demand of the IoT service, the remaining battery quantity acquired from the user device 30, the start time of receiving the start demand of the IoT service, and the "start" which is the timing when the remaining battery quantity is measured by the user device 30, corresponding to each other in the new entry prepared in the battery data 13b (operation S104).

In addition, when it is determined that the service area including the positional information of the user device 30 exists (operation S105: Yes), the processing set forth below is executed. That is, the first acquisition unit 15a registers the service ID received together with the start demand of the IoT service, the service area identified in operation S103, and the start time of receiving the start demand of the IoT service, corresponding to each other in the new entry prepared in the service use history data 13a (operation S106).

Subsequently, the first estimation unit 15b extracts the entry which coincides with the service ID received together with the start demand of the IoT service and further, which coincides with the service area identified in operation S103 among the entries of the service use history data 13a (operation S107). Then, the first estimation unit 15b averages the continuation time included in the entry extracted in operation S107 to estimate the service continuation time (operation S108).

Further, the second estimation unit 15c extracts the entry which coincides with the service ID received together with the start demand of the IoT service and further, coincides with the device ID of the user device 30 which demands the start of the IoT service among the entries of the device use history data 13d (operation S109).

Then, the second estimation unit 15c divides the remaining battery quantity of the user device 30 registered in operation S104 by the average value of the battery consumption rate, which is acquired by averaging the battery consumption rate included in the entry extracted in operation S109 estimate, so that the battery continuation time is estimated (operation S110).

In addition, the selection unit 15d determines whether the estimated battery continuation time is longer than the service continuation time, that is, whether the battery continuation time>the service continuation time (operation S111).

Herein, when it is determined that the estimated battery continuation time is longer than the service continuation time (operation S111: Yes), it may be determined that the possibility that the IoT service will be interrupted due to the battery cut-off even though the user device 30 senses the media data is low. In this case, the selection unit 15d selects the user device 30 as the sensing device (operation S112). Further, even when it is determined that the service area including the positional information of the user device 30 does not exist (operation S105: No), the user device 30 is selected as the sensing device (operation S112).

Meanwhile, when it is determined that the battery continuation time is not longer than the service continuation time (operation S111: No), it may be determined that the possibility that the IoT service will be interrupted due to the battery cut-off is high. In this case, the selection unit 15d selects the agent device 50 corresponding to the service area including the positional information of the user device 30 as the sensing device (operation S113).

After the sensing device is selected by operation S112 or S113, the selection unit 15d executes the processing set forth below. That is, the selection unit 15d registers the service ID received together with the start demand of the IoT service, the device ID possessed by the sensing device selected in operation S112 or S113, and the start time of receiving the start demand of the IoT service, corresponding to each other in the new entry prepared in the device use history data 13d (operation S114).

Thereafter, the selection unit 15d instructs the sensing device to sense and transmit the media data to start providing the IoT service (operation S115) and end the processing.

(2) History Update Processing

Figure 14:
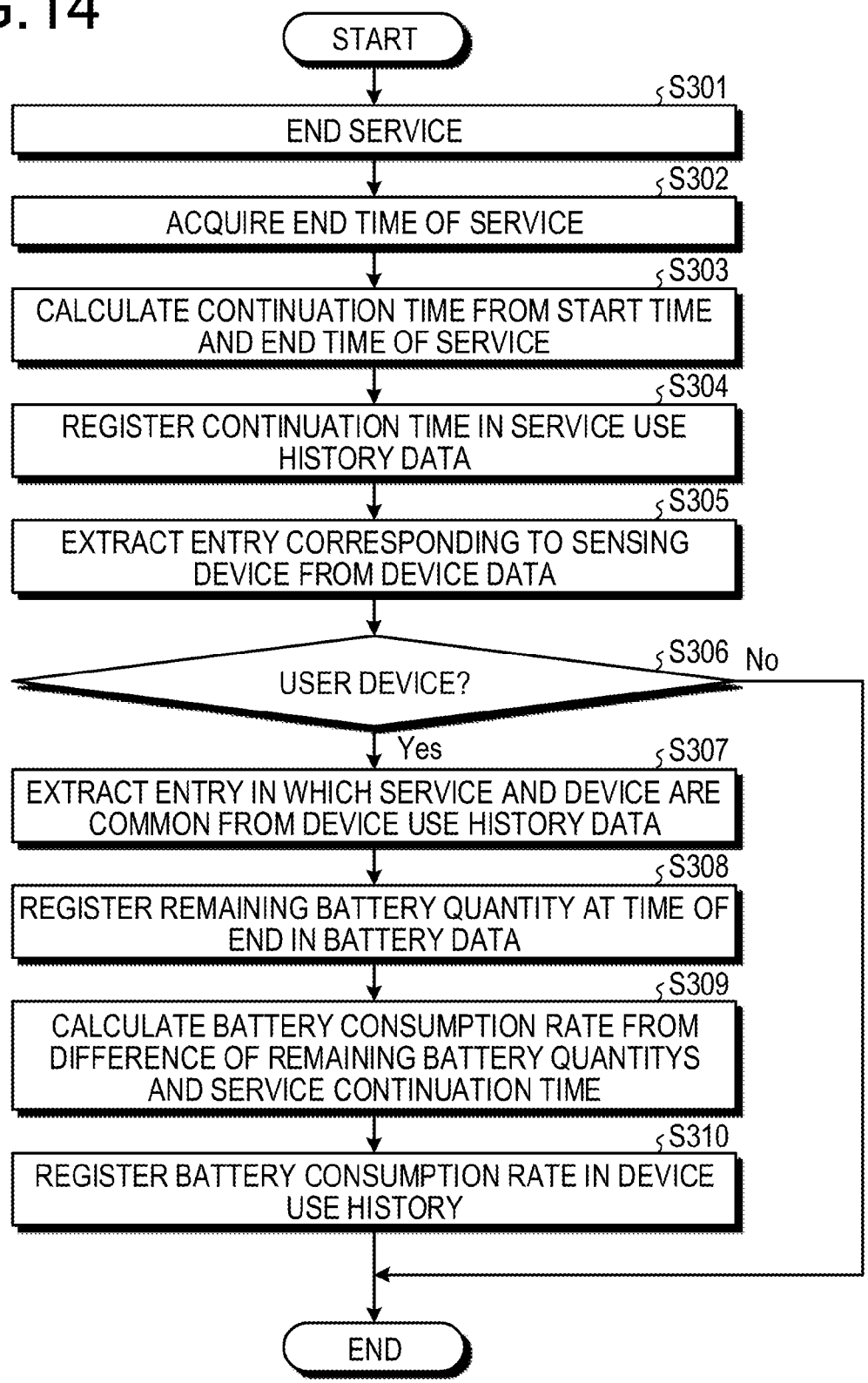
FIG. 14 is a flowchart illustrating a sequence of history update processing according to the first embodiment.

FIG. 14 is a flowchart illustrating a sequence of history update processing according to the first embodiment. The processing starts when the end demand is received from the user device 30 performing the start demand of the IoT service of which providing starts as one example.

As illustrated in FIG. 14, the second acquisition unit 15e instructs the sensing device selected in operation S111 or S112 illustrated in FIG. 13 to end sensing and transmitting the media data to end providing the IoT service (operation S301).

Subsequently, the second acquisition unit 15e acquires the time of receiving the end demand of the IoT service from the time stamp managed by the OS executed by the control unit 15, etc., as the end time (operation S302).

In addition, the second acquisition unit 15e performs a calculation of subtracting the start time registered in the entry of the service use history data 13a in operation S104 from the end time acquired in operation S302, that is, the end time-the start time to calculate the continuation time of the IoT service of which the end demand is received (operation S303).

Then, the second acquisition unit 15e registers the continuation time calculated in operation S303 in the entry which coincides with the service ID received together with the end demand of the IoT service and which coincides with the service area identified at the time of starting the IoT service and further, in which the field of the continuation time is blank among the entries of the service use history data 13a stored in the memory unit 13 (operation S304).

Subsequently, the second acquisition unit 15e extracts the entry having the device ID possessed by the sensing device selected in operation S111 or S112 among the entries of the device data 13c (operation S305). In addition, the second acquisition unit 15e determines whether the field of the type included in the entry extracted in operation S305 is "person", that is, whether the sensing device is the user device 30 (operation S306).

In this case, when the sensing device is the user device 30 (operation S306: Yes), the second acquisition unit 15e executes the processing set forth below. That is, the second acquisition unit 15e extracts the entry which includes a pair of the service ID of the IoT service of which the end demand is performed and the device ID possessed by the sensing device selected in operation S111 or 5112 and further, coincides with the start time of the IoT service among the entries of the device use history data 13d (operation S307).

Subsequently, the second acquisition unit 15e registers the device ID of the user device 30 performing the end demand of the IoT service, the remaining battery quantity acquired at the time of demanding the end from the user device 30, and the end which is the timing when the user device 30 measures the remaining battery quantity, corresponding to each other in the new entry prepared in the battery data 13b after acquiring the remaining battery quantity measured by the user device 30 (operation S308).

In addition, the second acquisition unit 15e divides the battery consumption acquired by subtracting the remaining battery quantity registered at the time of ending the IoT service in operation S308 from the remaining battery quantity registered at the time of starting the IoT service in operation S105 by the continuation time calculated in operation S303 to calculate the battery consumption rate (operation S309).

Then, the second acquisition unit 15e registers the battery consumption rate calculated in operation S309 in the entry which includes a pair of the service ID of the IoT service of which the end demand is performed and the device ID possessed by the sensing device selected in operation S111 or S112 among the entries of the device use history data 13d and further, in which the field of the consumption rate is blank (operation S310) and ends the processing.

Further, when it is determined that the sensing device is not the user device 30, that is, when the sensing device is the agent device 50 (operation S306: No), the agent device 50 is connected to the external power supply, and as a result, the battery consumption rate may not particularly be calculated. In this case, the processing just ends.

As described above, the server apparatus 10 according to the embodiment selects which one of the user device 30 and the agent device 50 will sense the media data used for the IoT device according to whether the battery continuation time of the user device 30 is longer than the service continuation time.

Therefore, the server apparatus 10 according to the embodiment may suppress the IoT service from being interrupted due to the battery cut-off. Further, when the battery cut-off of the user device 30 does not occur while providing the IoT service, the user device 30 is first selected, and as a result, the high-quality media data may be used for the IoT service as compared with the case where the media data is sensed by the agent device 50. In addition, the sensing subject may be suppressed from being switched from the user device 30 to the agent device 50 due to the battery cut-off. As a result, a series of media data may be acquired until the IoT service ends after the IoT service starts and the drop frame of the image or voice cut-off may be suppressed from occurring in the media data.

Second Embodiment

However, the embodiment of the disclosed device is described up to now, but the present disclosure may be carried out in various different forms in addition to the embodiment. Therefore, hereinafter, another embodiment included in the present disclosure will be described.

Option of User Device 30

The first embodiment exemplifies the case where one user device 30 is carried by one user, but a case may be provided where multiple user devices 30 are carried by one user. For example, a situation may exist in which one user carries the smart phone while wearing the head mount display and the smart watch. In order to cope with such a situation, a field is added to the device data 13c for an owner and the user ID of the owner of the IoT device is registered in the field. Then, the entry which coincides with the user ID corresponding to the device ID performing the start demand of the IoT service is extracted from the device data 13c to prepare a list of the device ID of the user device 30 carried by the user granted with the user ID. In this case, the battery continuation time is calculated for each user device 30 included in the list. Then, when a maximum battery continuation time in the battery continuation time calculated for each user device 30 is more than the service continuation time, the user device 30 having the device ID in which the maximum battery continuation time is calculated is selected as the sensing device. As a result, even when one user carries the multiple user devices 30, the sensing device may be appropriately selected.

Application Example of Method For Estimating Service Continuation Time

The first embodiment exemplifies the case where the continuation time of the entry extracted in operation S106 is averaged to calculate the service continuation time, but statistical processing other than the averaging may be performed to estimate the service continuation time. For example, a mode value or a median value in the continuation time of the entry extracted in operation S106 may be estimated as the service continuation time. Besides, a maximum value in the continuation time of the entry extracted in operation S106 may be estimated as the service continuation time. As a result, the service continuation time estimated from the history may be suppressed from being underestimated, and as a result, the battery cut-off of the user device 30 may be suppressed from occurring due to negligence of the estimation of the service continuation time.

Application Example of Method For Estimating Battery Continuation Time

The first embodiment exemplifies the case where the battery consumption rate of the entry extracted in operation S108 is averaged to calculate the battery continuation time, but statistical processing other than the averaging may be performed to estimate the battery continuation time. For example, the mode value or the median value in the battery consumption rate of the entry extracted in operation S108 may be estimated as the service continuation time. Besides, the maximum value in the battery consumption rate of the entry extracted in operation S108 may be used and estimated as the battery continuation time. As a result, the battery continuation time estimated from the history may be suppressed from being overestimated, and as a result, the battery cut-off of the user device 30 may be suppressed from occurring due to the negligence of the estimation of the battery continuation time.

Re-Estimation 1

The first embodiment exemplifies the case where the battery continuation time is estimated only in the step of receiving the start demand of the IoT service, but even after the user device 30 is selected as the sensing device, the battery continuation time may be estimated again. For example, after the IoT service starts, the server apparatus 10 may re-estimate the battery continuation time whenever a predetermined period, for example, 10 minutes elapse. In more detail, the first acquisition unit 15a acquires the remaining battery quantity from the user device 30 whenever the period elapses. In addition, the second estimation unit 15c divides the difference between the remaining battery quantity acquired after the IoT service starts and the remaining battery quantity acquired at the time of receiving the start demand in operation S105 by an elapsed time from the start time of the IoT service to re-estimate the battery continuation time. Instead of the battery consumption rate predicted from a past history, providing the IoT service starts and thereafter, the battery continuation time is re-estimated from an actual value of battery consumption which is actually consumed. Then, the selection unit 15d determines whether the re-estimated battery continuation time is longer than the service continuation time estimated at the time of receiving the start demand. In this case, when the battery continuation time is longer than the service continuation time, the sensing device is assumed as the user device 30 and when the battery continuation time is equal to or shorter than the service continuation time, the sensing device is switched from the user device 30 to the agent device 50. As a result, as the elapse time increases after the IoT service starts, the battery continuation time may be more accurately estimated, and as a result, even when there is an error in estimating the battery continuation time at the time of receiving the start demand, the sensing device may be switched to the agent device 50 before the user device 30 causes the battery cut-off.

Re-Estimation 2

The first embodiment exemplifies the case where the service continuation time is estimated only in the step of receiving the start demand of the IoT service, but even after the user device 30 is selected as the sensing device, the service continuation time may be estimated again. For example, after the IoT service starts, the server apparatus 10 may re-estimate the service continuation time whenever the predetermined period, for example, 10 minutes elapse. In more detail, the first estimation unit 15b re-extracts the entry having the continuation time which is longer than the elapse time after the IoT service starts among the entries extracted in operation S106 whenever the period elapses. Then, the first estimation unit 15b re-estimates the service continuation time by using the continuation time of the re-extracted entry. As a result, re-estimation may be performed by excluding a history having the continuation time which is shorter than the elapse time after the IoT service starts from estimation of the service continuation time. Then, the selection unit 15d determines whether the battery continuation time estimated at the time of receiving the start demand is longer than the re-estimated service continuation time. In this case, when the battery continuation time is longer than the service continuation time, the sensing device is assumed as the user device 30 and when the battery continuation time is equal to or shorter than the service continuation time, the sensing device is switched from the user device 30 to the agent device 50. Further, the "re-estimation 2" described in the present section may be executed in combination with the "re-estimation 1" described in the previous section. That is, the sensing device may be selected by comparing the re-estimated battery continuation time and the re-estimated service continuation time with each other.

Timing of Re-Estimation

The "re-estimation 1" and the "re-estimation 2" exemplify the case where the service continuation time and the battery continuation time are repeatedly re-estimated at a predetermined period, but the re-estimation may be executed first after the service continuation time estimated at the time of receiving the start demand in operation S107 elapses. As a result, a processing load applied to the re-estimation may be reduced. Continuous use of user device 30 being selected Further, when the sensing device is switched on the way, a service quality deteriorates, and as a result, only in the case where it is determined that the battery cut-off occurs when the user device 30 being selected is continuously used, the battery continuation time of the user device 30 other than the user device 30 being selected may be re-estimated and the sensing device may be re-selected. In detail, the battery continuation time is estimated with respect to not all user devices 30 but the user device 30 being selected, and the re-estimated service continuation time and the battery continuation time of the user device 30 being selected are compared with each other. When the battery continuation time of the user device 30 being selected is longer than the service continuation time, the user device 30 being selected is just continuously reselected. Meanwhile, when the battery continuation time of the user device 30 being selected is shorter than the service continuation time, it is determined that the battery cut-off occurs when the user device 30 being selected is continuously selected. After the determination, the battery continuation time is re-estimated and the sensing device is reselected with respect to the user device 30 other than the user device 30 being selected. As a result, if the user device 30 being selected does not cause the battery cut-off, the user device 30 being selected is continuously used to suppress unnecessary device switching and the deterioration in the service quality, which results from the switching, and re-estimation of the battery continuation time of another user device 30 or re-selection of the sensing device is not performed to reduce the processing load applied thereto.

Switching Timing Off Sensing Device

In the case of the IoT service which need not transmit the image or voice from the sensing device in real time, such as a service of photographing and transmitting the image at a predetermined interval, the service quality does not deteriorate even though the sensing device is switched during a period when the image or voice may not be transmitted. Therefore, a switchable timing or a switching disable timing of the sensing device is managed for each IoT service and when the IoT device different from the sensing device being selected is re-selected, the sensing device is switched at timings other than the switchable timing or the switching disable timing. Further, the switchable timing or the switching disable timing may be a timing which is statically determined together with the start of the IoT service, such as a regular time (30 minutes of every hour) or an elapse time (at an interval of 10 minutes) from the service start or a timing which is dynamically determined, such as a state without the voice for 5 minutes, etc. As a result, it is possible to suppress the deterioration of the service quality due to the switching of the sensing device.

Securing Remaining Battery Quantity

The first embodiment exemplifies the case where the value acquired by dividing the remaining battery quantity of the user device 30 by the past battery consumption rate when the user device 30 is used for the IoT service is estimated as the battery continuation time. That is, the battery continuation time is estimated by assuming the case where the user device 30 is used only for the IoT service. However, the user uses the user device 30 for preparing an electronic mail, managing a schedule, or performing another service or work in addition to using the IoT service. Therefore, when the remaining battery quantity is excessively reduced by using the user device 30, the user device 30 may not be used for separate purposes.

Therefore, when the battery continuation time is estimated in operation S109, not the remaining battery quantity of the user device 30 acquired in operation S105 but the remaining battery quantity in which a margin which remains for the separate purpose is reduced after using the IoT service is used as a usable remaining battery quantity for estimating the battery continuation time. A method for determining the remaining battery quantity which remains for the separate purpose is not limited herein, but the remaining battery quantity may be a predetermined quantity or may be determined by the user or the user device 30, and may be calculated from a user's work schedule of the day. As a result, using the entirety of the remaining battery quantity for the service may be suppressed and even after the IoT service is used, the user device 30 may be used.

Easing Condition for Device Selection

The first embodiment exemplifies the case where the sensing device is selected by comparing the service continuation time and the battery continuation time, but when the positional information of the user device 30 is out of the service area and further, the battery continuation time of all of the user devices 30 is shorter than the service continuation time, there is no selectable sensing device and the IoT service may not be provided. Therefore, multiple user devices 30 are selected and the user devices 30 are selected in order to solve the problem. In detail, when the start demand is received, the service continuation time and the battery continuation time are compared with each other and when the battery continuation time is shorter than the service continuation time, the battery continuation time of the multiple user devices 30 is summed up. When the battery continuation time which is summed up is longer than the service continuation time, the multiple user devices 30 are selected sequentially to be used for the IoT service. Although the battery continuation time of all of the user devices 30 is summed up, when the battery continuation time which is summed up is shorter than the service continuation time, the battery cut-off occurs while using the IoT service even though all of the user devices 30 are used sequentially, and as a result, the agent device 50 is selected (when the positional information of the user device 30 is out of the service area, the IoT service may not be used). Further, a method for selecting the multiple user devices 30 used for the IoT service is not particularly limited, but for example, the longer battery continuation time of the user device 30 may be first summed up. As a result, even when the user device 30 in a group which does not cause the battery cut-off does not exist, the IoT service may be used.

Coping with Multiple Services

The first embodiment describes the processing when the IoT service starts and ends, but multiple IoT services may be simultaneously used in an environment in which various IoT services exist. Therefore, in addition to the first service being provided, when a second service different from the first service starts, the battery continuation time is estimated based on the remaining battery quantity of the usable device and the past battery consumption rate when the user device 30 is jointly used as the sensing devices of the first and second services. In detail, the device use history data 13d includes records of the service IDs, the device IDs, the start time, and the battery consumption rate of all IoT services used by using a target device. That is, the battery consumption rate is maintained for each combination of used multiple IoT services and devices.

Further, as for the processing at the time of receiving the start demand, the second estimation unit 15c performs processing described below for each of all user devices 30. In detail, the entry in which the device ID and the device ID of the user device 30 are identical to each other and further, the battery consumption rate is blank is extracted by referring to the device use history data 13d. Hereinafter, this will be referred to as entry C. The entry C represents the combination of the IoT services to select the user device 30 as the sensing device, and therefore, only a maximum of one entry C is found with respect to the user device 30.

When the entry C is successfully extracted, the entry in which the service ID is acquired by adding the service ID in which the start of the IoT service is demanded to the service ID of the entry C and moreover, the device ID is identical to the device ID of the user device 30 is extracted by referring back to the device use history data 13d. Hereinafter, this will be referred to as entry D. The entry D is a past history in which the user device 30 is used in a combination of the service simultaneously used when the user device 30 is used in the IoT service of which the start is demanded.

When one or more entries D are found, the average of the battery consumption rate of the entries D is acquired and the remaining battery quantity of the user device 30 is divided by the average to estimate the battery continuation time of the user device 30. This is based on an assumption in which a possibility that the battery consumption rate when the same device is used in the same service combination will be similar is high.

When no entry D is found, that is, when there is no case where the user device 30 is used in the combination of the simultaneously used services, the current battery consumption rate of the user device 30 is acquired in the same order as the processing of operation S309. Further, the battery consumption rate when the user device 30 is used in the service of which the start is demanded is acquired in the same order as the processing of operation S109. A value acquired by summing up two battery consumption rates acquired as such is set as the battery consumption rate when the service being used and the service of which the start is demanded are simultaneously used to estimate the battery continuation time of the user device 30.

Meanwhile, when no entry C is discovered, the user device 30 is not used for any service, and as a result, the battery continuation time when the user device 30 is used in the service of which the start is demanded is acquired in the same order as the processing of operation S109.

Further, when selecting the sensing device and thereafter, recording the selected sensing device in the device use history data 13d, the selection unit 15d records both the service ID which uses the user device 30 and the service ID of which the start is demanded in the service ID. Simultaneously, the current battery consumption rate of the sensing device is calculated and recorded in the same order as the processing of operation S309 with respect to the entry C. When there is no entry C, the user device 30 is not used for any service, and as a result, anything may not particularly be done. Further, when the IoT service ends, it is the same as the first embodiment. By the processing, a single user device 30 is jointly used to use multiple IoT services.

Herein, when different user devices 30 are used with respect to the multiple IoT services, respectively, power is consumed for using the respective user devices 30. Therefore, in a case where the user device 30 being used may be simultaneously used, the corresponding user device 30 may be selected. Specifically, the battery continuation time is estimated with respect to not all user devices 30 but only the user device 30 which is used for a predetermined service and in the processing of the selection unit 15d, only in the case where it is determined that the battery cut-off occurs when the user device 30 being used is continuously used, the battery continuation time is estimated with respect to the user device 30 which is not used. As a result, the number of used devices may be reduced and the multiple IoT services may be efficiently used.

Further, in the processing, when the user device 30 which is not used for another IoT service is used for the IoT service of which the start is demanded, it is determined whether another IoT service using another user device 30 may be simultaneously used in the user device 30 of which the use starts and when the corresponding IoT service may be simultaneously used, the user device 30 is switched to the sensing device. In the case of the determination, after the IoT service of which the start is demanded starts, the battery continuation time is estimated with respect to another IoT service using another user device 30 and it may be determined whether the corresponding IoT service may be simultaneously used. As a result, the number of used devices may be reduced and the multiple IoT services may be efficiently used.

However, in this case, when the sensing device is switched, the service quality deteriorates. Therefore, it is determined whether the user device 30 being used is continuously used with respect to the first service and whether the sensing device is switched to the user device 30 used for the second service of which the start is demanded based on the service continuation time of the first and second services. For example, when a half or more of the service continuation time of the first service has already elapsed, the current user device 30 may be continuously used as it is and when the service continuation time of the second service is longer than the remaining time of the service continuation time of the first service, all remaining time may be used in the user device 30 after switching. As a result, the sensing device may be switched to the user device 30 used for the second service.

Device Selecting Program

Further, various processing described in the embodiment may be implemented by executing a previously prepared program by means of a computer such as a personal computer or a workstation. Therefore, hereinafter, one example of the computer that executes a device selecting program having the same function as in the embodiment will be described with reference to FIG. 15.

FIG. 15 is a diagram illustrating a hardware configuration example of a computer that executes a device selecting program according to the first embodiment and a second embodiment. As illustrated in FIG. 15, a computer 100 includes an operation unit 110a, a speaker 110b, a camera 110c, a display 120, and a communication unit 130. Further, the computer 100 includes a CPU 150, a ROM 160, an HDD 170, and a RAM 180. The respective units 110 to 180 are connected to each other through a bus 140.

As illustrated in FIG. 15, the HDD 170 stores a device selecting program 170a that exhibits the same functions as the first acquisition unit 15a, the first estimation unit 15b, the second estimation unit 15c, the selection unit 15d, and the second acquisition unit 15e described in the first embodiment. The device selecting program 170a may be integrated or separated in the same manner as the respective components of the first acquisition unit 15a, the first estimation unit 15b, the second estimation unit 15c, the selection unit 15d, and the second acquisition unit 15e illustrated in FIG. 2. That is, the HDD 170 may not particularly store all data described in the first embodiment and the data used for the processing may be stored in the HDD 170.

Under such an environment, the CPU 150 reads the device selecting program 170a from the HDD 170 and thereafter, develops the read device selecting program 170a to the RAM 180. As a result, the device selecting program 170a serves as a device selecting process 180a as illustrated in FIG. 15. The device selecting process 180a develops various data read from the HDD 170 to an area allocated to the device selecting process 180a among memory areas of the RAM 180 and executes various processing by using the developed various data. For example, one example of the processing executed by the device selecting process 180a includes the processing illustrated in FIG. 13 and FIG. 14, etc. Further, in the CPU 150, all processing units described in the first embodiment may not particularly operate and a processing unit corresponding to a processing to be executed may be virtually realized.

Further, the device selecting program 170a may not particularly be stored in the HDD 170 or the ROM 160 from the beginning. For example, the device selecting program 170a is stored in a flexible disk inserted into the computer 100, so-called, "portable physical media" including an FD, a CD-ROM, a DVD disk, a magneto-optic disk, an IC card, etc. In addition, the computer 100 may acquire the device selecting program 170a from the portable physical media and execute the acquired device selecting program 170a. Further, the device selecting program 170a may be stored in another computer or server apparatus connected to the computer 100 via a public line, the Internet, a LAN, a WAN, etc., and the computer 100 may acquire the device selecting program 170a from another computer or server apparatus and execute the acquired device selecting program 170a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A device selection method comprising:
receiving a start demand of a service from a first device;
acquiring positional information of the first device;

estimating a service continuation time of the service, based on a history of the service continuation time corresponding to an area to which the positional information belongs by referring to the history of the service continuation time for which the service is continuously provided for each area;

estimating a battery continuation time of the first device, based on a remaining battery quantity of the first device and a battery consumption rate of the first device at a time of receiving the start demand;

selecting one of the first device and a second device installed in the area to which the positional information belongs, based on the service continuation time and the battery continuation time; and causing a device selected between the first device and the second device to execute sensing of media data used for the service, by a processor.

2. The device selection method according to claim 1, wherein in the processor selects the first device when the battery continuation time is longer than the service continuation time, and the processor selects the second device when the battery continuation time is not longer than the service continuation time.

3. The device selection method according to claim 1, wherein the processor re-estimates the service continuation time by excluding the history of the service continuation time which is shorter than an elapse time after the service starts from the history of the service continuation time corresponding to the area to which the positional information belongs.

4. The device selection method according to claim 3, wherein the processor re-estimates the service continuation time when the elapse time after the service starts is longer than the service continuation time.

5. The device selection method according to claim 1, wherein the processor re-estimates the battery continuation time of the first device by using a difference between the remaining battery quantity of the first device at the time of receiving the start demand and the remaining battery quantity of the first device acquired after the service starts, and the battery consumption rate of the first device acquired from an elapse time after the service starts.

6. The device selection method according to claim 1, wherein the processor estimates a maximum continuation time in the history of the service continuation time corresponding to the area to which the positional information belongs, as the service continuation time.

7. The device selection method according to claim 1, wherein the processor estimates the battery continuation time of the first device, by using a maximum battery consumption rate in the history of the battery consumption rate of the first device.

8. A device selection apparatus comprising:
a memory; and
a processor coupled to the memory and the processor configured to:
receive a start demand of a service from a first device;
acquire positional information of the first device;
estimate a service continuation time of the service, based on a history of the service continuation time corresponding to an area to which the positional information belongs by referring to the history of the service continuation time for which the service is continuously provided for each area;
estimate a battery continuation time of the first device, based on a remaining battery quantity of the first device and a battery consumption rate of the first device at a time of receiving the start demand;
select one of the first device and a second device installed in the area to which the positional information belongs, based on the service continuation time and the battery continuation time; and
cause a device selected between the first device and the second device to execute sensing of media data used for the service, by a processor.

9. A computer-readable non-transitory recording medium storing a program that causes a computer to executed a procedure, the procedure comprising:
receiving a start demand of a service from a first device;
acquiring positional information of the first device;
estimating a service continuation time of the service, based on a history of the service continuation time corresponding to an area to which the positional information belongs by referring to the history of the service continuation time for which the service is continuously provided for each area;
estimating a battery continuation time of the first device, based on a remaining battery quantity of the first device and a battery consumption rate of the first device at a time of receiving the start demand;
selecting one of the first device and a second device installed in the area to which the positional information belongs, based on the service continuation time and the battery continuation time; and
causing a device selected between the first device and the second device to execute sensing of media data used for the service.

* * * * *